US010103795B2

(12) United States Patent
Houser et al.

(10) Patent No.: US 10,103,795 B2
(45) Date of Patent: Oct. 16, 2018

(54) SYSTEM AND METHOD FOR PROVIDING A DISTRIBUTED DIRECTIONAL APERTURE FOR CELLULAR COMMUNICATION

(71) Applicant: NORTHROP GRUMMAN SYSTEMS CORPORATION, Falls Church, VA (US)

(72) Inventors: Peter B. Houser, Poway, CA (US); Mark S. Adams, Ashburn, VA (US)

(73) Assignee: NORTHROP GRUMMAN SYSTEMS CORPORATION, Falls Church, VA (US)

( * ) Notice: Subject to any disclaimer, the term of this patent is extended or adjusted under 35 U.S.C. 154(b) by 0 days.

(21) Appl. No.: 15/171,123

(22) Filed: Jun. 2, 2016

(65) Prior Publication Data

US 2016/0359537 A1    Dec. 8, 2016

Related U.S. Application Data

(60) Provisional application No. 62/169,642, filed on Jun. 2, 2015.

(51) Int. Cl.
| | | |
|---|---|---|
| *H04M 1/00* | (2006.01) |
| *H04B 7/06* | (2006.01) |
| *H04W 4/02* | (2018.01) |
| *H04W 84/04* | (2009.01) |

(52) U.S. Cl.
    CPC .......... *H04B 7/0617* (2013.01); *H04W 4/025* (2013.01); *H04W 84/042* (2013.01)

(58) Field of Classification Search
    CPC ............................ H04B 7/0617; H04W 4/025

USPC ....................................................... 455/562.1
See application file for complete search history.

(56) References Cited

U.S. PATENT DOCUMENTS

| | | | | |
|---|---|---|---|---|
| 7,817,590 B2* | 10/2010 | Kasapi | .................. | H04W 16/28 370/312 |
| 9,252,908 B1* | 2/2016 | Branlund | ................ | H04J 14/00 |
| 2006/0055599 A1* | 3/2006 | McIntire | ............ | H01Q 21/0025 342/368 |
| 2006/0202892 A1* | 9/2006 | Feng | ........................ | H01Q 3/24 342/374 |
| 2007/0099571 A1* | 5/2007 | Withers, Jr. | ......... | H04B 7/0408 455/67.11 |
| 2007/0242691 A1* | 10/2007 | Rhee | .................. | H04Q 11/0005 370/465 |
| 2009/0103593 A1* | 4/2009 | Bergamo | ............... | H04B 1/707 375/146 |
| 2009/0280866 A1* | 11/2009 | Lo | ......................... | H01Q 1/246 455/562.1 |
| 2011/0201357 A1* | 8/2011 | Garrett | .................. | G01S 5/0252 455/456.2 |
| 2012/0047201 A1* | 2/2012 | Jain | .................. | H04N 21/26225 709/203 |

(Continued)

*Primary Examiner* — Md Talukder
(74) *Attorney, Agent, or Firm* — McNair Law Firm, P.A.

(57) ABSTRACT

A cellular communication transceiver including an array which includes a plurality of aperture elements distributed over one or more surfaces, the aperture elements being configured to receive and transmit cellular communication signals, a beamformer configured to apply a time domain beamforming process to the cellular communication signals to enable directional receive and transmit beams to be formed using the aperture elements, and a telemetry subsystem operably coupling the aperture elements to the beamformer.

20 Claims, 13 Drawing Sheets

(56) References Cited

U.S. PATENT DOCUMENTS

| | | | | |
|---|---|---|---|---|
| 2012/0169561 | A1* | 7/2012 | Bin Basri | H01Q 21/12 343/814 |
| 2013/0029685 | A1* | 1/2013 | Moshfeghi | G01S 19/48 455/456.1 |
| 2013/0230013 | A1* | 9/2013 | Seo | H04L 27/2602 370/329 |
| 2015/0102942 | A1* | 4/2015 | Houser | H04Q 9/00 340/870.3 |
| 2016/0080060 | A1* | 3/2016 | Yu | H04B 7/0626 455/452.2 |
| 2016/0282462 | A1* | 9/2016 | Pitts | G01S 7/006 |
| 2016/0359537 | A1* | 12/2016 | Houser | H04B 7/0617 |

* cited by examiner

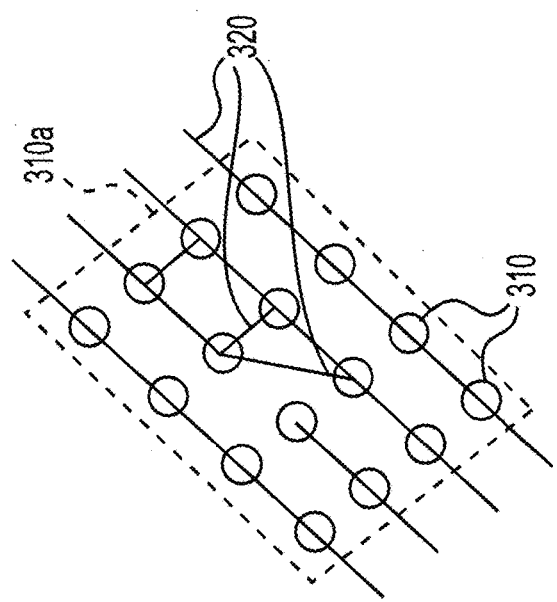
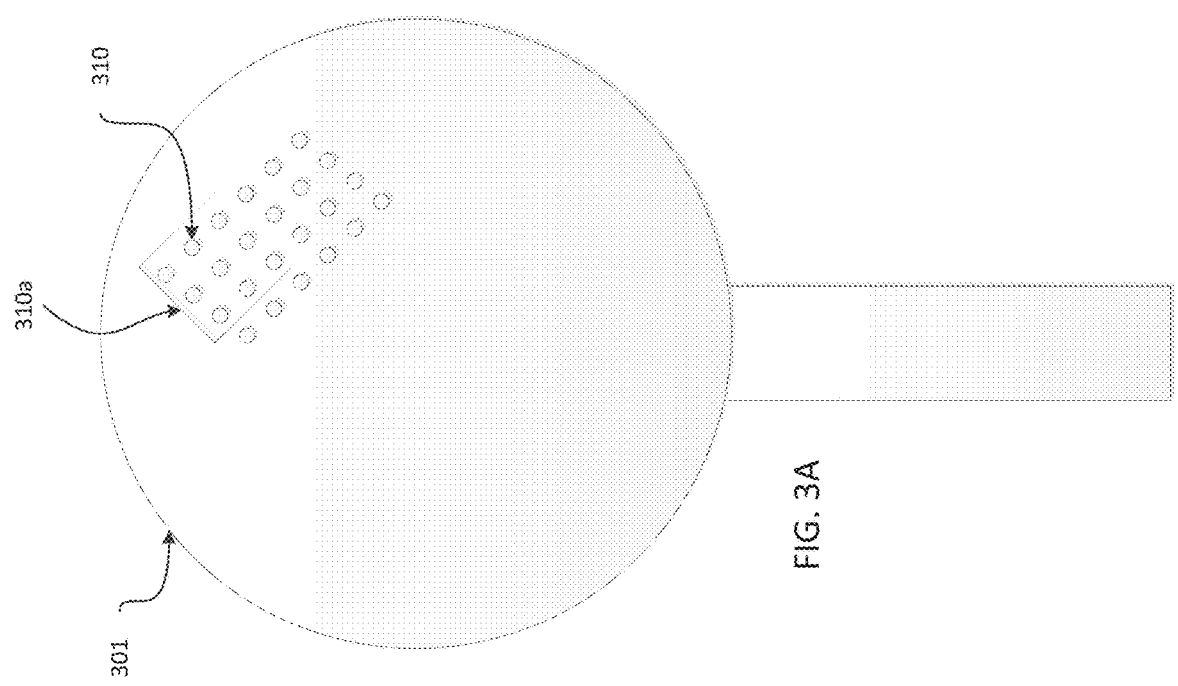
FIG. 3B
FIG. 3A

SYSTEM AND METHOD FOR PROVIDING A DISTRIBUTED DIRECTIONAL APERTURE FOR CELLULAR COMMUNICATION

CROSS REFERENCE TO RELATED APPLICATIONS

This application claims the benefit of U.S. Provisional Application No. 62/169,642 filed on Jun. 2, 2015, the entire contents of which are hereby incorporated herein by reference.

TECHNICAL FIELD

Example embodiments generally relate to wireless communication and, more particularly, relate to a distributed directional aperture for cellular communication.

BACKGROUND

The expanding use of cellular communications has quickly consumed the radio frequency spectrum allotted to cellular communications. In some instances the cellular spectrum is further limited because it is shared with other communication technologies, such as WiFi, television, and Bluetooth.

Cellular communications are typically transmitted through cellular base stations using 3 antennas with a 120 degree beam width. This translates to 3 beams available for use for each channel of the cellular spectrum, which may be markedly insufficient for the number of users. Cellular base stations which are adjacent to or include overlapping transmission range with a neighboring base station may further limit spectrum channels to prevent interference.

Cellular providers may use subscriber codes, such and an international mobile subscriber identity to identify devices and enable encoded transmissions, enabling two or more devices to utilize the same 120 degree beam. The encoding of transmissions may include frequency domain multiple access (FDMA), code division multiple access (CDMA), polarization division multiple access (PDMA), time division multiple access (TDMA), or the like. However, these methods of coding have a limited number of available access slots.

Geographically based services based on cellular triangulation are dependent on the beam width and tower density and may suffer inaccuracies due to the relatively large beam widths of current cellular arrays especially in areas of low tower density. Each base station may determine a range in a beam arc which is may include the device to be located, the overlap of the beam arcs correspond to the estimated location of the device. Since the beam width is 120 degrees the beam arc as close as a mile away from the base station may be immense, resulting in unusable location information.

Cellular base stations are traditionally large elevated antenna towers which provide general cellular service to a wide coverage area. These large coverage areas may have portions in which the user density is very high causing interference and/or structures, in which, cellular coverage is blocked.

BRIEF SUMMARY OF SOME EXAMPLES

Some example embodiments may therefore provide a distributed directional aperture for cellular communication. In this regard, some embodiments may provide for a cellular communication transceiver including an array including a plurality of aperture elements distributed over a surface, the aperture elements being configured to receive and transmit cellular communication signals, a beamformer configured to apply a time domain beamforming process to the cellular communication signals to enable directional receive and transmit beams to be formed using the aperture elements, and a telemetry subsystem operably coupling the aperture elements to the beamformer.

In another example embodiment, a cellular communication transceiver is provided including an array comprising a plurality of aperture elements distributed over a plurality of surfaces of one or more entities, the aperture elements being configured to receive and transmit cellular communication signals from a cellular device substantially within the array, a beamformer configured to apply a time domain beamforming process to the cellular communication signals to enable directional receive and transmit beams to be formed using the aperture elements, and a telemetry subsystem operably coupling the aperture elements to the beamformer.

In yet a further embodiment, a cellular communication transceiver is provided including an array comprising a plurality of aperture elements distributed over a surface, the aperture elements being configured to receive and transmit cellular communication signals, a beamformer configured to apply a time domain beamforming process to the cellular communication signals to enable directional receive and transmit beams to be formed using the aperture elements, a telemetry subsystem operably coupling the aperture elements to the beamformer, and a spectrum coordinator configured to receive cellular communication spectrum channel usage data and provide the beamformer channel data to limit cellular communication interference. The directional transmit beam is based on the channel data.

BRIEF DESCRIPTION OF THE DRAWINGS

For embodiments of a system and method for providing a distributed directional aperture for cellular communication to be clearly understood and readily practiced, such embodiments will be described in conjunction with the following figures, wherein:

FIG. 3A is a view of a water tower having exemplary distributed DDA system shown in FIG. 1.

FIG. 3B is an enlarged view of the sensors and/or emitters and telemetry connections shown in 3A.

DETAILED DESCRIPTION

Figure 1:
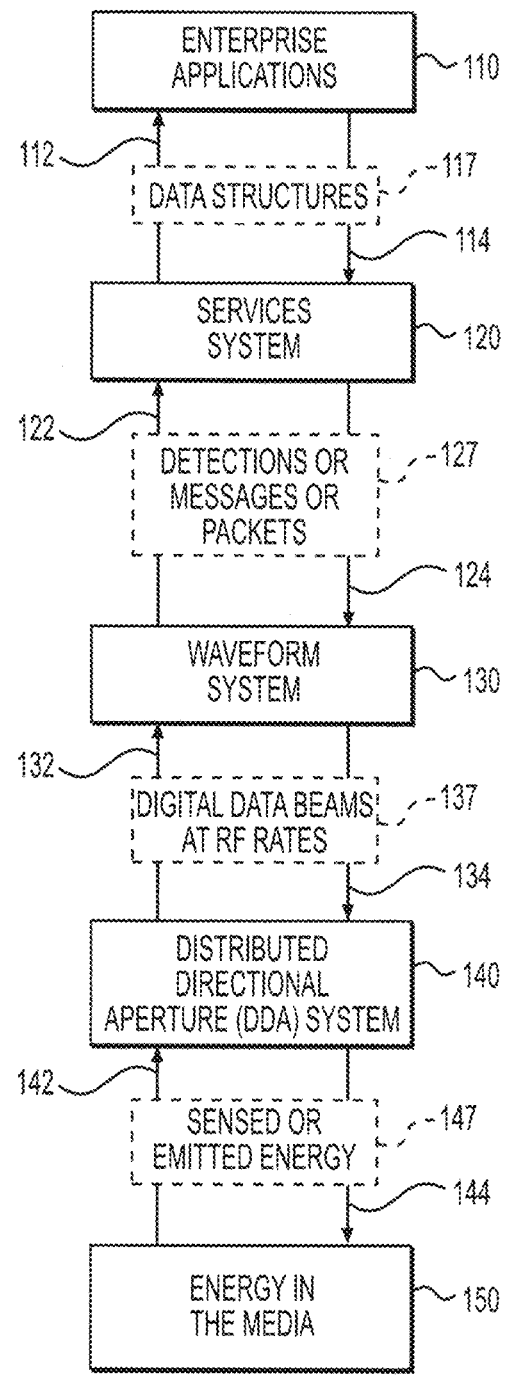
FIG. 1 is a flow chart illustrating an exemplary embodiment of a system for providing a distributed directional aperture (DDA) system for cellular communications.

It is to be understood that the figures and descriptions of embodiments of a system and method for providing a distributed directional aperture described herein may have been simplified to illustrate elements that are relevant for a clear understanding, while eliminating, for purposes of clarity, other elements found in a typical antenna system or antenna method. Those of ordinary skill in the art will recognize that other elements may be desirable and/or required in order to implement the embodiments described herein. However, because such elements are well known in the art, and because they do not facilitate a better understanding of a system and method for providing a distributed directional aperture, a discussion of such elements is not provided herein. It is also to be understood that the drawings included herewith only provide diagrammatic representations of the presently preferred structures of the system and method for providing a distributed directional aperture and that structures falling within the scope of a system and method for providing a distributed directional aperture may include structures different than those shown in the drawings. Reference will now be made to the drawings wherein like structures are provided with like reference designations.

Throughout this disclosure, the term "telemetry" may be interpreted to include monitoring and non-monitoring of critical parameters. For example, raw digitized (e.g., RF) waveform samples may be packetized and transported via an optical interface to the Beamforming computer 470, 570 discussed below with reference to FIGS. 4 and 5.

Objects of embodiments described herein are realized by a distributed directional aperture (DDA) system which provides information reception and transmission capabilities.

Throughout this disclosure, the term "entity" may be interpreted to include any fixed or movable structures. Some example entities may include cellular towers, water towers, buildings, natural formation, internals walls or surfaces of an occupiable structure, air craft, lighter than air platform, or the like. In an example embodiment, the entity may have a field of view of the space in which a user resides and a cross line of sight with respect to a user.

The DDA system, e.g. cellular communication transceiver, in an embodiment in which the DDA system is configured for cellular communications, may include an array, e.g. the sensing and emitting subsystem, including a plurality of aperture elements, such as sensors and emitters. The DDA system may include a telemetry subsystem, which is comprised of multiple telemetry connections that collectively interconnect the sensing and emitting array subsystem with a Beamformer Subsystem. The DDA system may also include a beamformer subsystem that processes receive or transmit data in order to create beams for reception or transmission. The terms aperture element, aperture, and sensor or emitter may be interchangeably used throughout this specification.

The sensing and emitting array subsystem may be comprised of multiple apertures, e.g. sensors and emitters, which are installed across, within, or under the external surfaces of an entity, or in some instances on interior surfaces of an entity. The sensors and emitters may be homogenous, with all having identical configuration and capabilities.

Alternatively, the sensors and emitters may be heterogeneous, with varying sensors and emitters that are individually optimized for specific characteristics, and are selected for use based upon the current aperture mission. For example, the sensing and emitting array subsystem may comprise distinct sensing units (sensors) and emitting units (emitters), or it may comprise units having both sensing and emitting capabilities. Individual sensors and emitters may differ in characteristics such as polarization, directional sensitivity, and frequency band sensitivity.

An embodiment of the telemetry subsystem, may be comprised of physical connections between the sensors and emitters and the beamformer subsystem. The physical connections may convey information between the sensors and emitters and the beamformer subsystem using a telemetry protocol. The physical connections may be fiber optic, electrical, or wireless, and will support a data rate sufficient to convey the digitized energy samples. The telemetry protocol may be simple and point-to-point or may be bussed using a protocol such as Time Domain Multiple Access (TDMA). The telemetry subsystem may provide connections only within a single local entity or may provide connections spanning sensors and emitters that are distributed across multiple entities that are physically dispersed, such as multiple buildings.

An embodiment of the beamformer subsystem may be comprised of processing nodes, interconnect channels, and software, with external connections to the telemetry subsystem, the platform navigation system, and the platform waveform system. The processing nodes and interconnect channels may collectively provide a parallel data processing capability that is sufficient to implement beamforming analysis for information reception and transmission. For reception, the beamforming analysis may temporally align the data received from the sensors through the telemetry subsystem. The temporal alignment may be based upon the position and attitude of the platform, computed using the externally-supplied platform data. The beamformer subsystem may create streams of directionally received sensor data and route those streams to the waveform system. For transmission, the beamformer subsystem analysis may compute the signals which for each emitter in order to transmit energy in a specific direction and power level, based upon the position and attitude of the platform, computed using the externally-supplied platform data. The beamformer subsystem computes the signals for each emitter, potentially aggregating signals when the emitter will be used for multiple purposes simultaneously. The beamformer subsystem may route the emission signals to the appropriate emitters through the telemetry subsystem.

In the context of cellular communication, the DDA may provide cellular communication beam with beam widths of 3-5 degrees, or in some instances, less than 3 degrees. The small beam width may allow a cellular communication base station to have a 5000 percent increase in cellular channel reuse, since beam may be generated in multiple directions and elevations without overlap.

The apertures elements, e.g. sensors and emitters, may be applied to any entity by a variety of means allowing nearly any structure to be a viable candidate for application of an array. This may allow for an increase in the number of cell base stations available to a network. This may also reduce the necessity to build structures for the sole purpose of communications, e.g. cellular towers. Additionally the apertures elements may be applied to internal to structures, such as walls, allowing for a cellular array in places which may have limited coverage under current systems.

The relatively small beam width may provide significantly more accurate location crossfix determinations, e.g. cell tower triangulation of a device. Since the beam width may be 3-5 degrees versus 120, the beam arc at a determined distance may be substantially smaller. As such the over lap with other cell tower beam arc, either with DDA or conventional may be substantially reduced.

In some example embodiments, the DDA array portion may be distributed over a plurality of surfaces and/or entities. The beam former may be able to determine a highly accurate location for a cellular device and generate a transmit beam based on the cellular location based on signal ratios at respective sensors. In some instances, the DDA array portion may be distributed across one or more internal surfaces of an entity. This may allow the DDA to sense receive beams and emit transmit directional beams within a building or other occupiable structure.

In some example embodiments, the DDA may provide an emissions focus to a particular location within the array coverage area by tuning the waveform of the emitters. The point focus may further expand the reuse of the cellular spectrum.

In another example embodiment, the DDA may include a spectrum coordinator configured to receive the receive beam location, e.g. azimuth, elevation, and/or, distance, and channel usage information of adjacent cellular towers of DDAs and provide the beamformer with channel data, e.g. channels which will have limited or no interference at the specified location.

These and other objects, features, and advantages of the inventions described herein will be apparent and fully understood from the following detailed description, taken in connection with the appended drawings.

FIG. 1 is a flow chart illustrating an exemplary embodiment of a system for providing a distributed directional aperture (DDA) system for cellular communications. The distributed directional array (DDA) System 140 may exchange Sensed or Emitted Energy 147 using Energy in the Media 150. The DDA may also exchange Digital Data Beams at RF Rates 137 with the Waveform System 130. Sensed energy 142 may propagate through a media, e.g. air, water, or the like, and eventually reaching the DDA entity, where it is then received by the DDA system. The sensed signals 142 may be processed by the DDA 140 in order to create digital reception data beams 132 for analysis by the waveform system 130. Emitted energy 144 may be generated by the DDA system and then propagated outward through the media. The DDA system may convert digital transmission data beams 134 that are generated by the waveform system 130 into signals 144 that are then emitted into the media.

In a preferred DDA embodiment, the data beams for reception 132 and transmission 134 may be digital and convey samples at a rate that fully captures the information of the corresponding emitted or sensed frequency signal. The data rate may be at least the highest emitted or radiated frequency of interest multiplied by the Nyquist criteria, e.g., a 1 GHz signal in the media will correspond to a 2.5 GHz digital data rate through the data beams. It may also be possible to pass the digital data beams at lower rates. The greatest system capability, and the greatest potential for commonality between different purposes, may be when the data beams operate at the full Nyquist rate.

In an example embodiment of the DDA, the receive beams 132 and transmit data beams 134 may be connected to existing waveform systems without modification to those waveform systems. The existing waveform systems, such as base transceiver stations (BTS), are designed for connection to existing omnidirectional antennas. The DDA may be transparently connected to such systems, providing directional inputs to those systems, and thereby improving those systems' performance.

The waveform system 130 may comprise well understood systems for communications, electronic intercept, electronic interference, and sensing. In a preferred embodiment, the waveform system may be generalized to host any of those services in a common hardware suite. This more general waveform system may be best positioned to take advantage of the DDA capabilities. The waveform system 130 may provide received detections or messages or packets 122 to the services system based upon reception beam data 132. The waveform system may accept messages or packets 124 for transmission from the services system and use that data to generate transmission beam data 134.

In an example embodiment, the Waveform System 130 may encompass a very wide range of services, all using the DDA System to connect with the energy in the media 150. The waveform system may encompass conventional services such as communications, jamming, intercept, and physical sensing (e.g., radar). The waveform system may also encompass new services that are not possible with current apertures.

The services system 120 may provide capabilities such as encryption, decryption, and digital packet routing. The services system may exchange detections or messages or packets 127 with the waveform system 130. These services systems may be current, existing equipment, such as a KG-250 encryption device. In an example embodiment, the common services system will be generalized to host any of those services in a common hardware suite. A more general waveform system may be able to take advantage of the DDA capabilities. The services system 120 may exchange reception data structures 112 and transmission data structures 114 with the enterprise applications 110.

The enterprise applications system 110 may provide system-level capabilities to the end user community. The enterprise application system 110 may exchange data structures 117 with the services system 120. The DDA may provide greater performance to the communications, electronic intercept, electronic interference, and sensing systems encompassed within the enterprise applications, thereby providing greater capability to the user communities that are serviced by the overall capabilities depicted in FIG. 1.

In an example embodiment, the DDA system may service multiple domains within the waveform system, the services system, and the enterprise applications. These domains may include communications, electronic intercept, electronic interference, and sensing. In some example embodiments, the DDA system may service only a single such domain, potentially with replicated DDA systems for individual domains.

Figure 2:
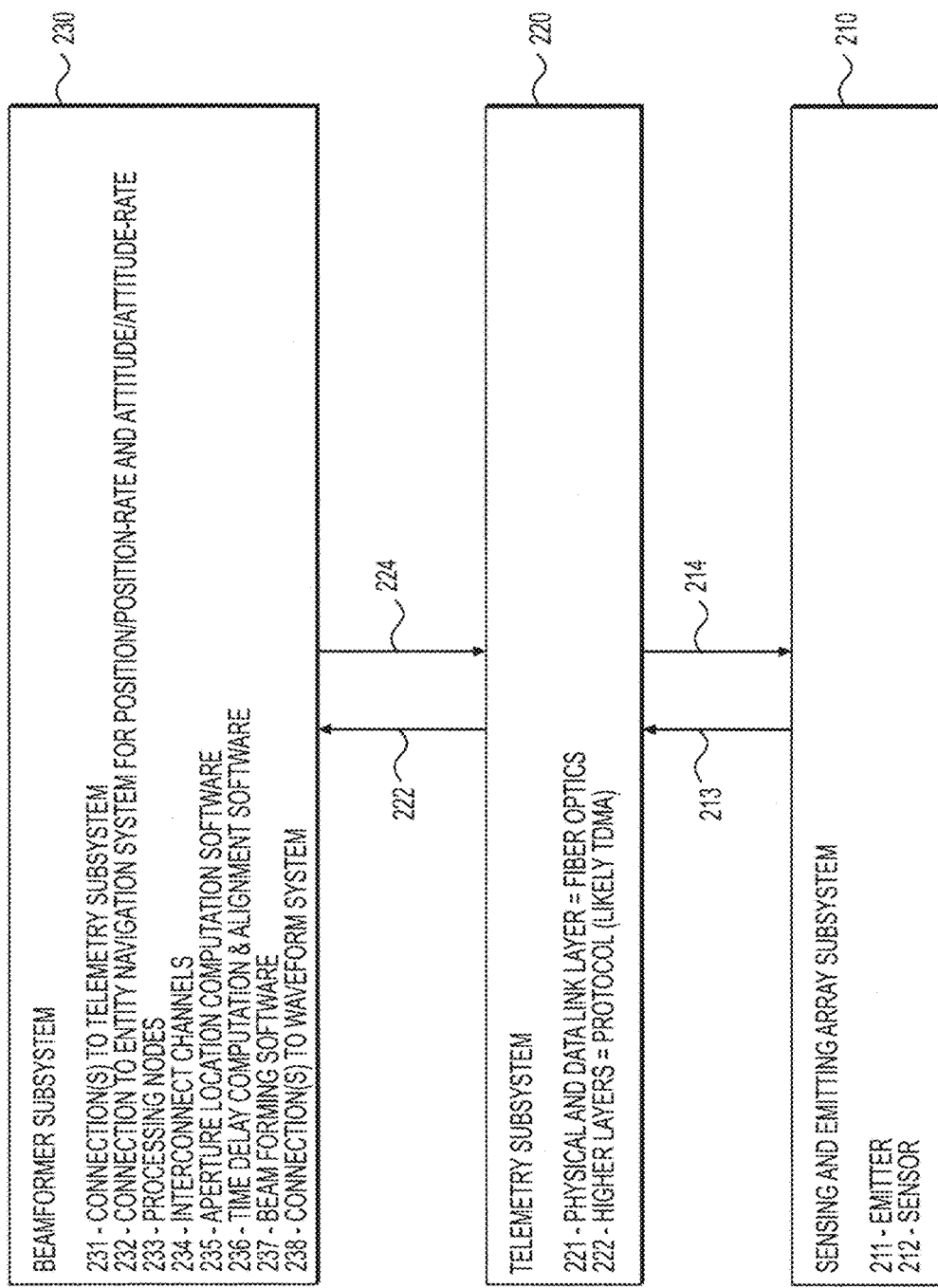
FIG. 2 is a schematic illustrating subsystems of the DDA system shown in FIG. 1.

FIG. 2 is a schematic illustrating subsystems of the DDA system 140 shown in FIG. 1. The sensing and emitting array subsystem 210, e.g. array, may provide the connection between the DDA and the energy in the media. In an example embodiment, individual array subsystem elements may be dedicated to sensing or to emitting. In another preferred embodiment, individual array subsystem elements may provide both sensing and emitting capabilities. Individual apertures, e.g. sensors 212 and emitters 211, may also be optimized for performance in specific frequencies, polarities, or other characteristics. The sensing and emitting array subsystem may comprise a homogenous set of sensors and emitters or may comprise a heterogeneous set of sensors and emitters. At any given time, an optimized subset of sensors and emitters would then be selected based upon the mission and the characteristics of the intended receive or transmit signals.

Individual sensors and emitters may provide both sensing and emission capabilities, thereby combining the transmission and reception into a single unit. Sensors and emitters that combine multiple capabilities may in general have lesser impact on the entity design than sensors and emitters that are dedicated to more specific capabilities since fewer multi-capability sensors and emitters may be used to provide a desired sampling density. However, single-capability sensors and emitters may be more capable with respect to their single purpose. Some example embodiments include both single-capability and multi-capability sensors and emitters.

The sensors and emitters may be individually packaged for installation onto the entity. Alternatively, multiple sensors and emitters may be packaged and installed onto the entity as a group. Individually-packaged sensors and emitters may be smaller and more easily accommodated on the entity, while multiply-packaged sensors and emitters may require less telemetry between the elements and the beamformer.

The telemetry subsystem 220 may provide the connection between the sensing and emitting array subsystem 210 and the beamformer subsystem 230. The telemetry subsystem may be comprised of physical and data link layers 221 between the sensors and emitters and the beamformer subsystem. The physical connections may convey information between the sensors and emitters and the beamformer subsystem using the higher layers 222 which may provide a telemetry protocol. The physical connections may be fiber optic, electrical, or wireless, and will support a data rate sufficient to convey the digitized energy samples. The telemetry protocol may be simple and point-to-point or may be bussed using a protocol such as Time Domain Multiple Access (TDMA). The telemetry subsystem may provide connections only within a single local entity or may provide connections between sensors and emitters that are distributed across multiple entities that are physically dispersed.

The Beamformer Subsystem 230 may host the processing capabilities to create receive and transmit beams. The Beamformer Subsystem 230 may be comprised of connections to other systems, processing nodes, interconnect channels, and software.

The connection to the telemetry subsystem 231 may provide the physical connection and protocols that allow the beamformer to communicate with the sensors and emitters. The connection to a entity navigation system 232 may provide the position, attitude, position rates, and attitude rates of the entity so that these quantities may be used by the time delay computation and alignment software 236. A connection to the waveform system 238 may provide the connection for exchanging reception and transmission beam data with the waveform system.

The processing nodes 233 and interconnect channels 234 may collectively provide a parallel data processing capability which may be sufficient to implement beamforming analysis for information reception and transmission. The beamforming analysis may be accomplished by aperture location computation software 235, time delay computation and alignment software 236, and/or beamforming software 237. In an example embodiment, there may be a plurality of processing nodes and interconnect channels. This embodiment may aggregate the processing capacity of the processing nodes and interconnect channels to provide a cumulative capability. In some example embodiments, only a single processing node may be provided, having sufficient processing capacity to provide all of the capabilities.

A reception beamforming process may coherently sum signals received through the telemetry subsystem from multiple sensors in order to create a reception beam that is focused in a specific direction, e.g. a directional receive beam, by temporally aligning the data and then summing the individual time domain samples. The temporal alignment may be based upon the position and attitude of the platform, computed using the externally-supplied platform data.

A transmission beamformer process may generate signals for transmission by multiple emitters, of the array, in such a way that the emission beam is focused in a specific direction, e.g. a directional transmit beam, by creating and temporally aligning the emitted data stream for each emitter. The generated signals 2240 may be based upon the position and attitude of the platform, computed using the externally-supplied platform data. The Beamformer Subsystem 230 may route the emission signals to the appropriate emitters through the Telemetry Subsystem 220.

Aperture location and computation software 235 may compute the location of each sensor and emitter so that the reception and transmission temporal alignment values may be computed based upon the relative locations of the sensors and emitters.

FIG. 3A is a view of a water tower having exemplary distributed sensors and/or distributed emitters, telemetry connections, and a beamforming device, of the DDA system shown in FIG. 1. FIG. 3B is an enlarged view of the sensors and/or emitters and telemetry connections shown in 3A. The sensing and emitting array subsystem elements 310, previously discussed in the context of FIGS. 1 and 2, may be installed on the exterior surface, within the surface, or on the interior surface of an entity, such as the surface of the water tower 301. The choice of installation location would be based upon the skin materials, and structural of the entity. Metallic skins may be opaque to most energy signals so the elements may be installed on the exterior of a metallic skin. The elements may be quite small and may be suitable for lying flat on the skin of the entity, held in place by adhesive or environmentally-suitable tape.

In one example embodiment, a set of sensors and emitters with the associated telemetry may be pre-placed onto a strip of tape which would then be applied to the surface of an entity. In a second embodiment, the sensors 212 and emitters 211 may be stenciled onto the skin of the entity using a metallic paint prior to installation of the balance of the element components and telemetry components. In third example embodiment, the sensors and emitters and telemetry may be embedded within the interior of a composite material skin as part of the skin fabrication process. In a fourth example embodiment, the antenna 411 and 511 components of the sensors and emitters (discussed below in FIGS. 4 and 5) may be installed on the exterior of the skin while the balance of the sensor and emitter components may be installed on the interior of the skin, with a microscopic hole through the skin for an electrical connection between them. In any of the above embodiments, the emitter and/or sensors may be formed on flexprint in order to conform to the entity's shape. Many other installation embodiments will be understood by a person skilled in the art of aperture design and installation and all such embodiments are envisioned by this design. It would also be understood by one of ordinary skill in the art that the installation embodiments may be utilized individually or in any combination.

The sensors and emitters may, in an example embodiment, be installed within the interior of the entity rather than on the exterior or skin of the entity. Such a design may be comparable to conventional radar dome and sonar dome installations.

The sensor and/or emitter installation location on the entity may be optimized to provide the desired field of view while not compromising entity characteristics, such as structural efficiency. Stable surfaces, horizontal faces, and edges may be preferred installation locations in many embodiments.

The quality of the beamformer outputs will be a function of the number of aperture elements and the total span of the aperture elements across the entity. In an embodiment, a span of at least 48*X, (lambda), where X, is the wavelength of the highest frequency of interest, is provided. In some embodiments, spacing between each sensor and between each emitter may be nominally 0.5*X. However, the example embodiments are merely for illustrative purposes, some example embodiments may deviate from these general guidelines without compromising the overall design integrity.

FIG. 3B illustrates a local group of sensors and/or emitters 310a with interconnecting telemetry. The sensors and/or emitters 310 are interconnected via the telemetry 320. In a preferred embodiment this telemetry would conform to the skin of the entity or be embedded within the skin of the entity. The telemetry topology is further discussed in FIG. 6.

Figure 4:
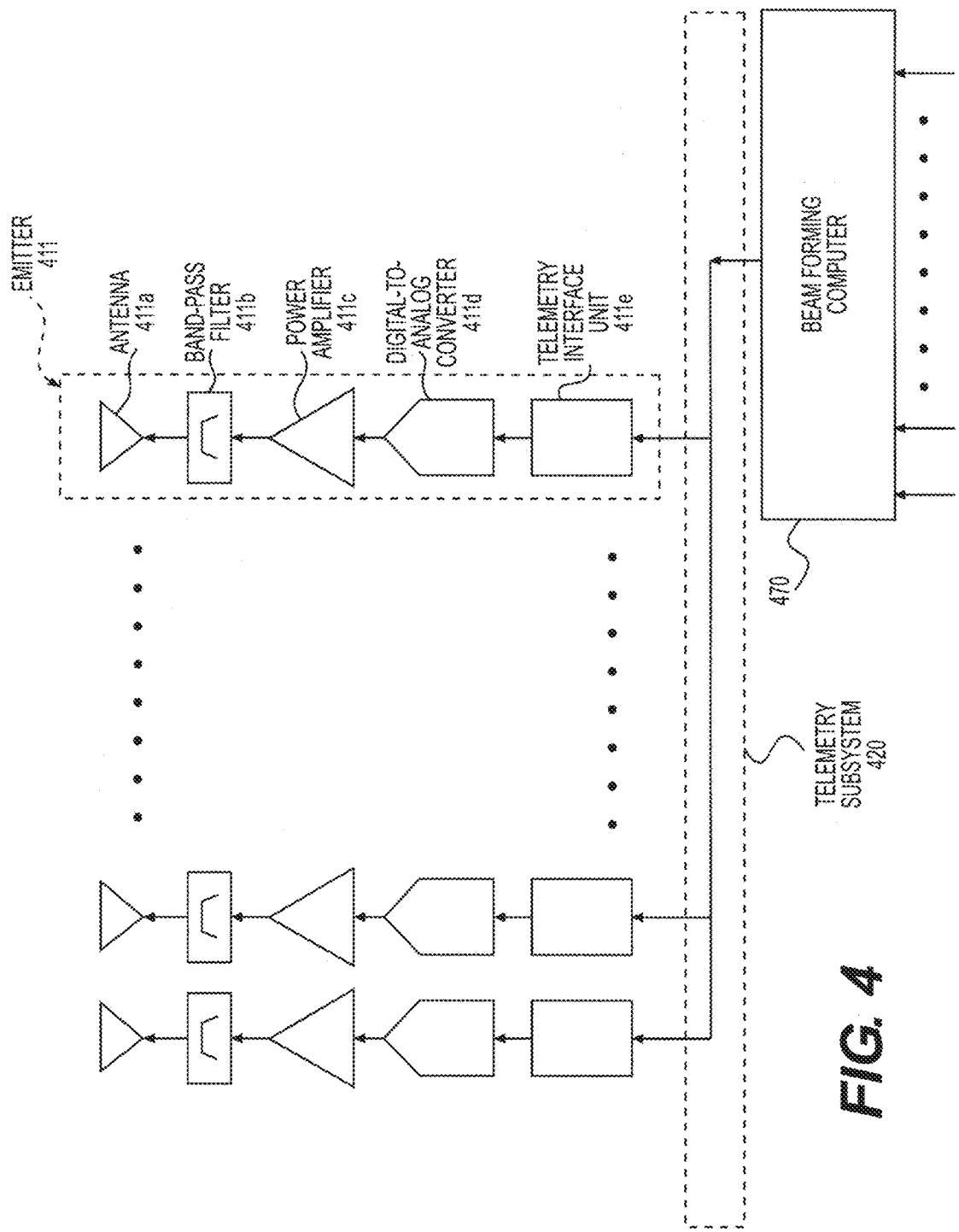
FIG. 4 is a schematic block diagram of an emitter, within the sensing and emitting subsystem shown in FIG. 2.
Figure 5:
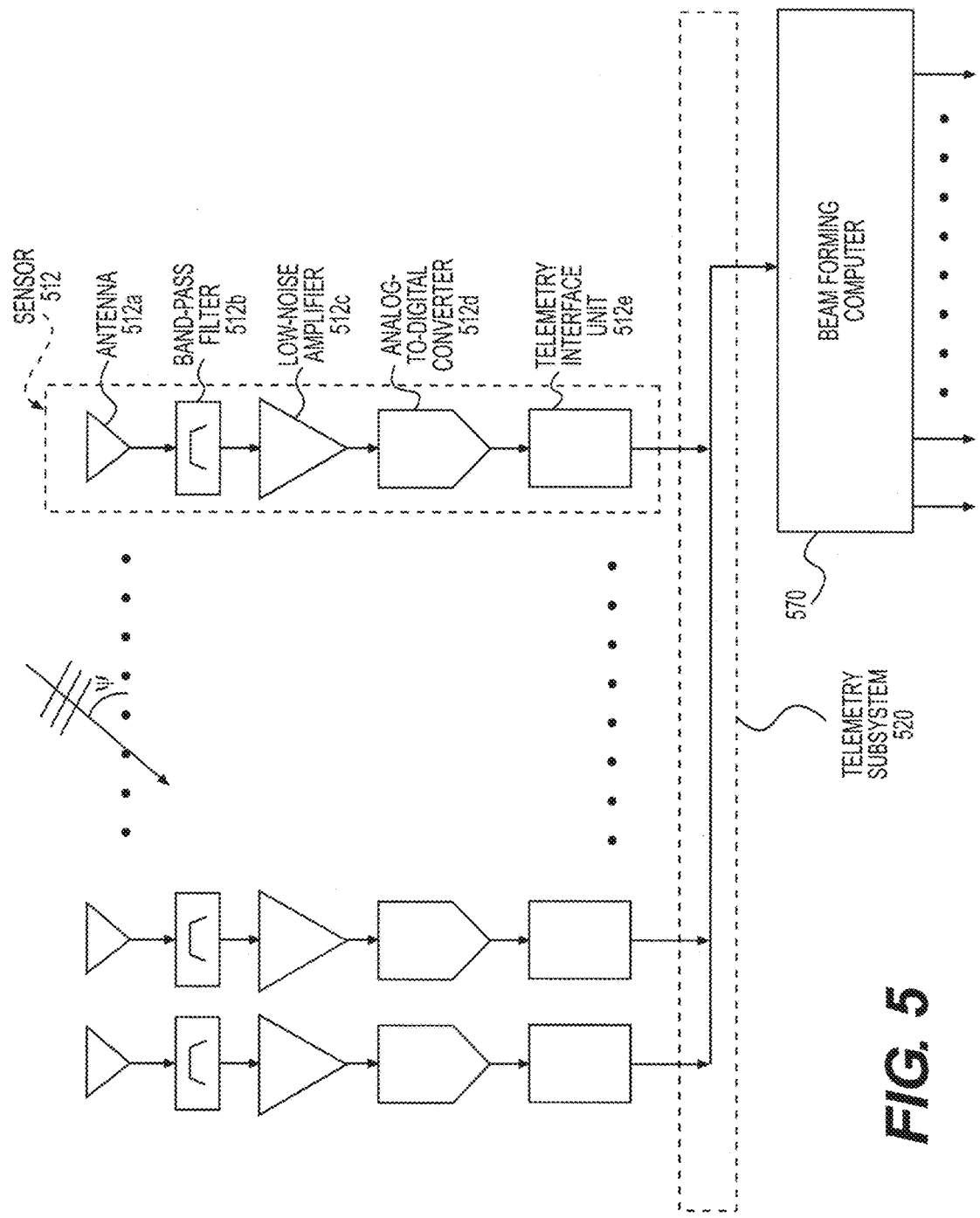
FIG. 5 is a schematic block diagram of a sensor, within the sensing and emitting subsystem shown in FIG. 2.

FIG. 4 is a schematic block diagram of an emitter within the sensing and emitting subsystem shown in FIG. 2. FIG. 5 is a schematic block diagram of a sensor within the sensing and emitting subsystem shown in FIG. 2. The receiving antenna (energy collector) 512a within the sensor 512 may absorb energy from the media and convert it to electrical signals. For radio frequency energy, the antenna may comprise a piece of small gauge wire that is tuned to the desired frequency. Alternatively, the antenna may be a complex circuit assembly. Alternatively, in the case of acoustic energy, the antenna may be a small hydrophone. In any of these embodiments, the antenna may absorb energy in the media and convert it to electrical energy within the sensor.

In an example embodiment, once power has been received by the antenna 512a the received analog signal may be band-pass filtered 512b to remove frequencies outside of the range of interest and amplified 512c to match the analog-to-digital converter 512d electrical characteristics. The analog to digital converter may sample the analog signal at a rate that is appropriate to the highest frequency of interest and then passes the sample data through the telemetry interface 512e and the telemetry subsystem 520 to the beamformer system 570. The analog-to-digital unit may be capable of processing at least at a rate that is sufficient to perform time domain beamforming at the highest signal of interest, e.g., for a 1 GHz frequency the sampling must be nominally 2.5 GHz.

The transmitting antenna (energy emitter) 411a within the emitter 411 may emit energy based upon electrical signals that are initiated in the beamformer subsystem 470 and are passed through the telemetry subsystem 420 and the telemetry interface 411e to the digital-to-analog system 411D. The antenna may comprise a piece of small gauge wire that is tuned to the desired frequency. Alternatively, the antenna may be a complex circuit assembly. Alternatively, in the case of acoustic energy, the antenna may be a small speaker element. In any of these embodiments, the antenna may receive signals from the digital-to-analog system 411D and emit corresponding energy into the media.

In an example embodiment, the beamformer may compute transmit signals for each emitter and passes those signals through the telemetry 420 to the telemetry interface unit 411e. The telemetry unit may pass the signals to the digital-to-analog converter 411d and the resulting analog signals may be amplified by the power amplifier 411c. The resulting signals may be band passed filtered 411b and then emitted by the transmitting antenna 411a. The digital-to-analog unit may be capable processing at least at a rate that is sufficient to generate power outputs at the highest signal of interest, e.g., for a 1 GHz frequency the sampling must be nominally 2.5 GHz.

Figure 6:
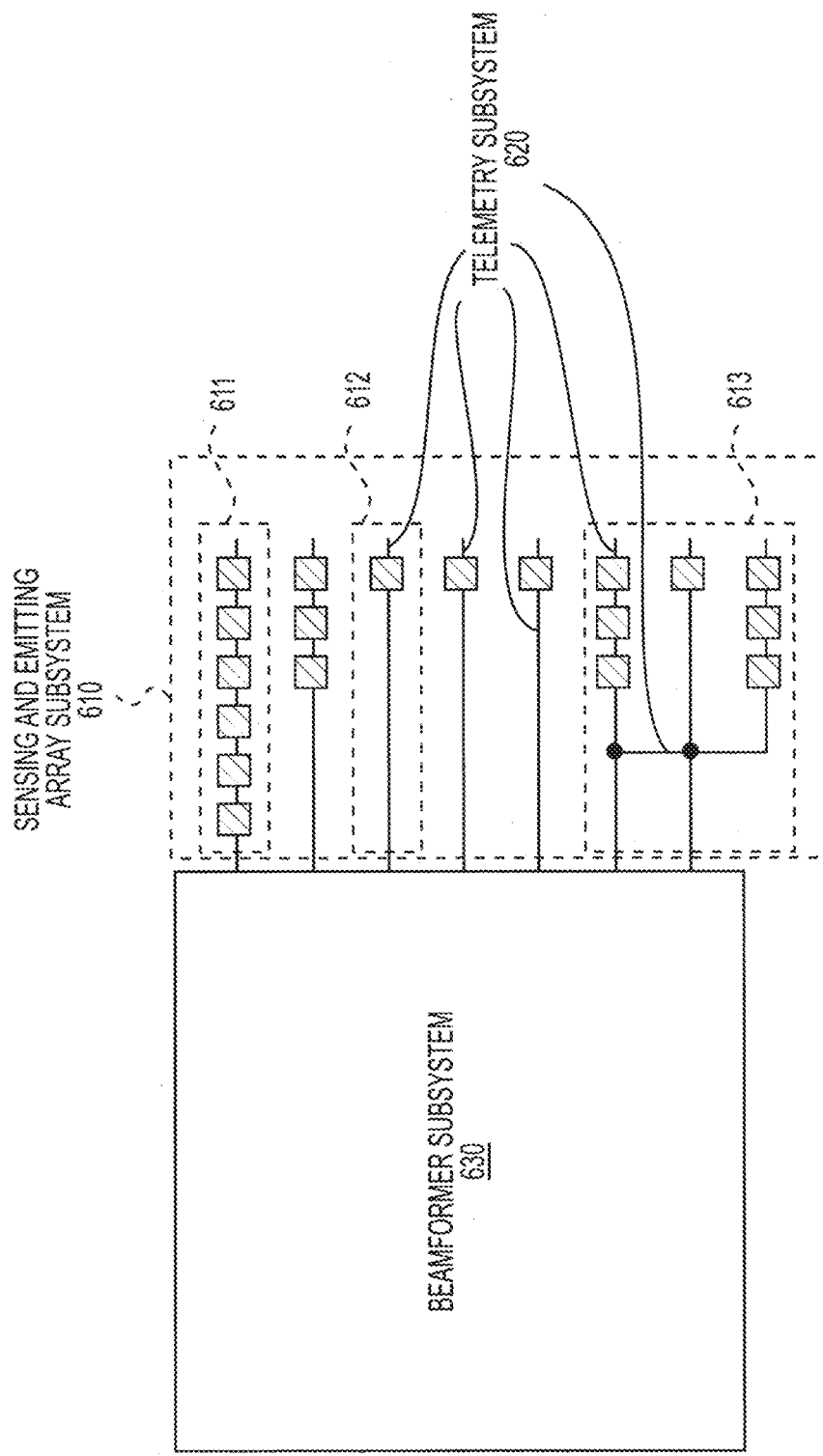
FIG. 6 is a block diagram including the telemetry subsystem shown in FIG. 2, illustrating point-to-point and bussed architectures.
Figure 7:
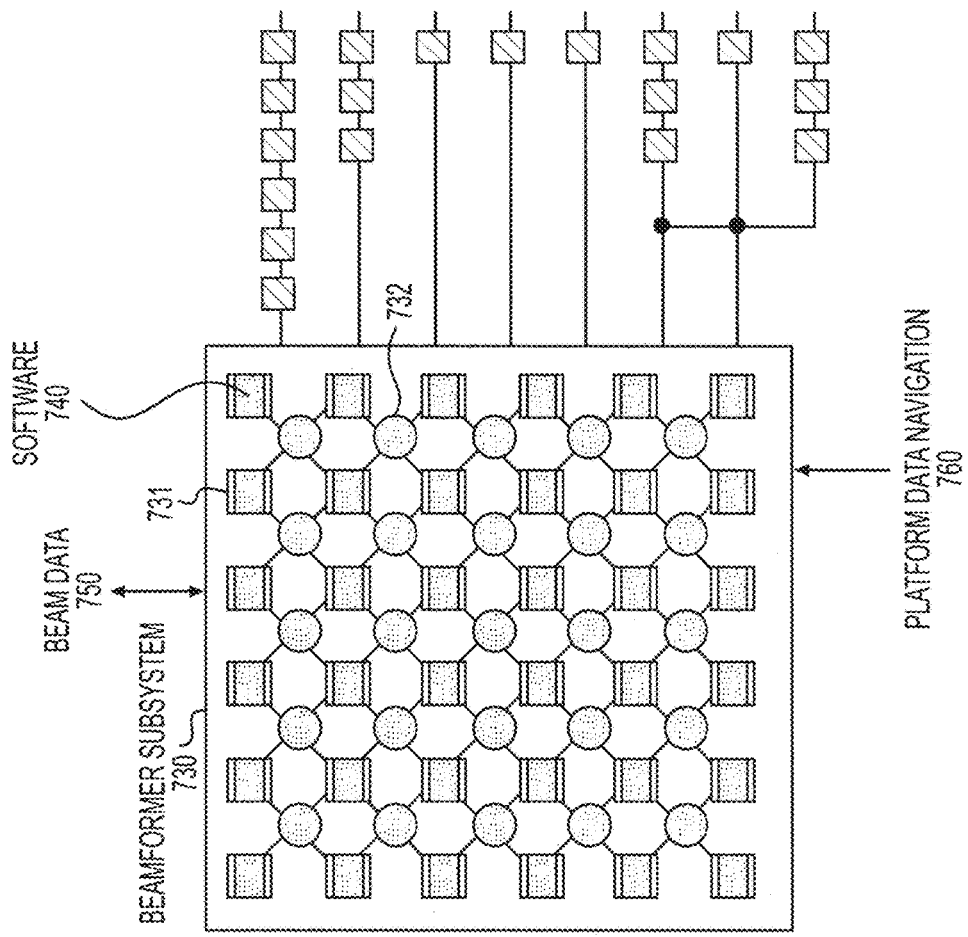
FIG. 7 is a block diagram including the beamformer subsystem shown in FIG. 2, illustrating processing nodes exchanging data through interconnect channels. Allocation of functionality (i.e., processing to the processing nodes) is also depicted.

The telemetry interface units 411e and 512e may provide the electrical and protocol capabilities to connect a specific sensor and/or emitter to the Beamformer Subsystem that is illustrated in FIG. 7 through the telemetry subsystem that is illustrated in FIG. 6. The telemetry interface unit must match both the physical and protocol characteristics of the telemetry subsystem.

The sensors and emitters may require electrical power for operation. The connections to supply such power are not illustrated in FIG. 4 or 5 for clarity of the figure, but would be immediately appreciated by one of ordinary skill in the art. In one example embodiment, the electrical power may be conveyed through a Telemetry Subsystem that is based upon fiber optics. Current technologies have demonstrated the capacity to transmit small amounts of power though fiber optics which may be sufficient for the sensors and emitters. In another example embodiment, electrical power may be provided through a metallic wire to the sensors and emitters. In a yet another preferred embodiment, electrical power may be conveyed by a magnetic or electrical field that surrounds the emitters and sensors and is converted to electrical power by the emitters and sensors. Fiber optic and wireless power connections may be beneficial because of their low impact on the host entity and their resistance to interference by the environment.

FIG. 6 is a block diagram of the telemetry subsystem shown in FIG. 2, illustrating point-to-point and bussed architectures. FIG. 6 includes a block for the beamformer subsystem 630 to illustrate that the telemetry subsystem 620 connects the sensor and emitting array subsystem 610 to the beamformer subsystem 630.

In an example embodiment the telemetry subsystem 630 may be bi-directional, conveying information for transmission from the beamformer to the emitters and received information from the sensors to the beamformer. In another example embodiment, the telemetry system may be unidirectional, conveying only information for transmission or reception.

In some example embodiments, the physical telemetry architecture may be point-to-point, bussed, or bussed with junction points. In a point-to-point configuration 612 each sensor or emitter is directly tied through the telemetry to a port on the beamformer subsystem 630. This embodiment may provide the simplest design, and potentially maximizes total telemetry throughput. In a bussed configuration 611 a set of sensors and emitters are connected to a single beamformer port. The data from the sensors and emitters is multiplexed onto a single telemetry line using a protocol such as TDMA or CDMA. In a bussed with junction points configuration 613 the telemetry lines may interconnect outside of the beamformer subsystem. This embodiment may require the fewest input ports on the beamformer.

In an example embodiment, the telemetry may be physically implemented as fiber carrying optical signals, as metallic wires carrying electrical signals, or as wireless signals. Fiber optic connections may offer a high data rate and may be impervious to electrical interference. Metallic wire may easily convey electrical power to the sensors and emitters. Wireless connections impose the least impact on the entity.

The sensors and emitters may require electrical power for operation and the electrical power distribution may be an element of the telemetry subsystem. In some example embodiments, the telemetry subsystem will comprise fiber optic interconnects and power may be sufficiently available through the fiber. In another example embodiment, the telemetry subsystem may include a network of metallic wiring for power distribution.

In some example embodiments, the telemetry subsystem may exist solely within the form of the entity. In another example embodiment, the telemetry may bridge between two or more entities to provide overall DDA capabilities that utilize the sensors and emitters on each entity. Such cooperative processing may include accurate timing and positional synchronization between the cooperating entities, e.g. DDA subsystems.

FIG. 7 is a block diagram of the Beamformer Subsystem shown in FIG. 2, illustrating processing nodes exchanging data through interconnect channels. Allocation of functionality (i.e., software to the processing nodes) is also depicted. The beamformer subsystem 730 may comprise processor nodes 731 that may execute the processor software 740. The processor nodes may communicate via an interconnect mesh that may be implemented using router nodes 732. In an example embodiment, the processor nodes, routers, and interconnect mesh may be implemented on a single electronic chip. Multiple chips may be interconnected to create a processor array of sufficient processing capacity.

In an example embodiment, congruence may be established between processors and the sensors and emitters. One or more processors may be loaded with the received data from a sensor through the telemetry and may use the received data to perform the calculations to create directional reception beams of data at the appropriate beamformer output rates. In addition, one or more processors may be assigned the task of creating ready-for-transmit data that may be transmitted to a specific emitter through the telemetry.

In some example embodiments, the processor software, may be distributed across the beamformer array of processor nodes, and may provide the capability to compute received beams data 750 based upon the sensor data that may be stored within the beamformer processors. Each received beam may comprise the sampled data from the less directional sensors that has been computationally transformed in a manner such that the received beam corresponds to the sampled data that may have been received from a directional antenna that may be pointed and stabilized in a specified direction.

In a an example embodiment, the processor software, as distributed across the beamformer array of processor nodes, may also provide the capability to compute data that may be ready for emission based upon transmit beam data 750 that is received from the waveform system. The transmit beam data may be computationally transformed to compute the equivalent signals that may be emitted by the individual emitters in order to create energy in the media that corresponds in power and direction of the transmit beam data.

The receive and transmit beam data 750 may be created by the beamforming software 740 that executes on the processors 731. Such capabilities are well understood by persons familiar with the art of digital signal processing, e.g. one of ordinary skill in the art. The beamforming software may have three principal functions. First, the beamforming software may receive platform navigation data 760 and may use the platform navigation data to compute the relative position of some or all sensors and emitters across the entity. Platform navigation data may include the position, altitude, velocity, or the like of fixed or movable entities. Second, the beamforming software may use the sensor and emitter positions to compute the corresponding time delays that may be needed for temporal alignment when creating receive or transmit beams. Third, the beamforming software may apply the time delays to the received sensor data to create reception beams and to the transmission beam data to create data for the emitters.

Figure 8:
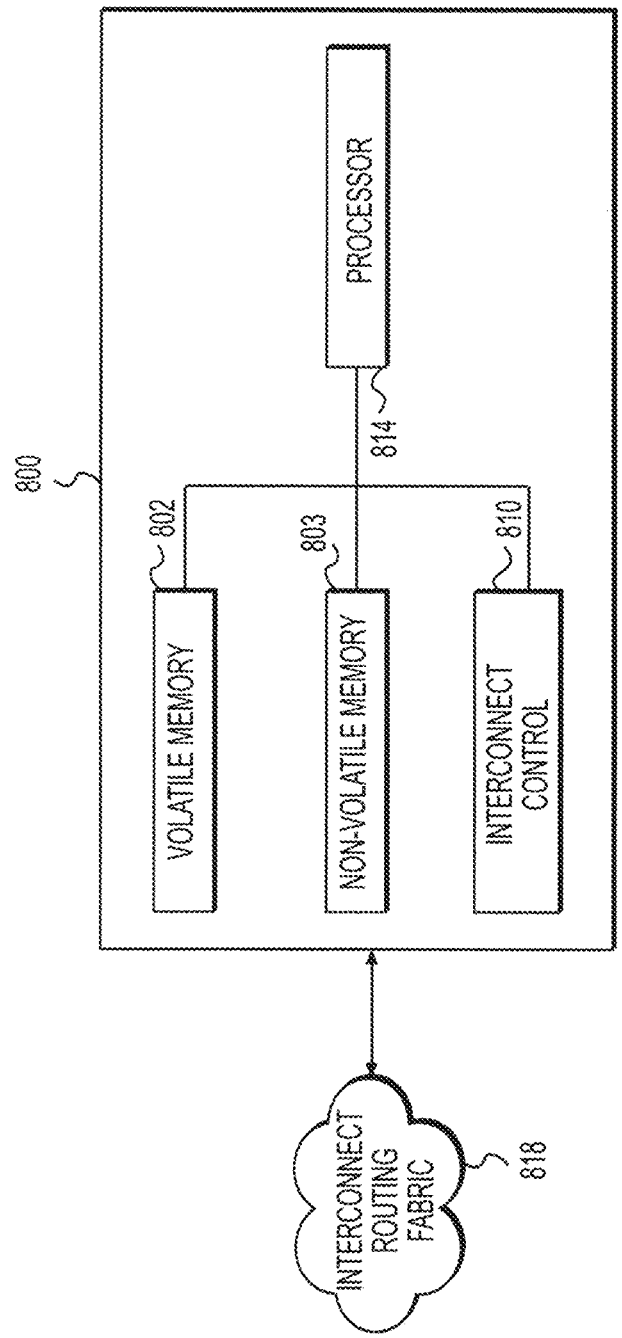
FIG. 8 illustrates exemplary hardware components of a processing node within the beamformer subsystem that may be used in connection with the method for providing a DDA system for sensing or emitting energy.

FIG. 8 illustrates exemplary hardware components of a processing node 800 within the beamformer subsystem that may be used in connection with the method for providing a DDA system for sensing or emitting energy for cellular communication. The processing node includes a processor 814 that may be capable of executing the beamforming software 740. The processing node also may include non-volatile memory 803 for storing the software itself, volatile memory 802 for storing intermediate results during software execution, and interconnect control 810 for maintaining connections with other processor nodes through the interconnect routing fabric 818. In some example embodiments, the memory, processor, and interconnect control may be implemented as areas within a gate array processor and may be replicated within the gate array to provide a plurality of processor nodes.

The DDA systems and methods described throughout this disclosure may implement additional exemplary hardware components. For example, the processing node 800, or other computer system similarly configured, may include and execute one or more subsystem components to perform functions described herein, including steps of methods described above. Likewise, a mobile device which includes some of the same components of processing node 800 may run an application and perform steps of methods described above. Processing node 800 may connect with a network, e.g., Internet, or other network, to receive inquires, obtain data, and transmit information.

Processing node 800 may also include a secondary storage device. Processing node 800 may also include a plurality of processors and be configured as a plurality of, e.g., bladed servers, or other known server configurations. Processing node 800 may also include an input device, a display device, and an output device. Volatile memory 802 may include RAM or similar types of memory, and may store one or more applications for execution by processor 814. Non-volatile memory 803 or secondary storage device may include a hard disk drive, floppy disk drive, CD-ROM drive, or other types of non-volatile data storage. Processor 814 executes the application(s), such as subsystem components, which are stored in Volatile memory 802, Nonvolatile memory 803, or secondary storage, or received from the Internet or other network. The processing by processor 814 may be implemented in software, such as software modules, for execution by computers or other machines. These applications preferably include instructions executable to perform the system and subsystem component (or application) functions and methods described above and illustrated in the figures herein. The applications may optionally provide graphical user interfaces (GUIs) through which users may view and interact with subsystem components (or application in mobile device).

Processing node 800 may store one or more database structures in non-volatile memory 803 or secondary storage 404, for example, for storing and maintaining databases, and other information necessary to perform the above-described methods. Alternatively, such databases may be in storage devices separate from subsystem components.

Also, as noted, processor 814 may execute one or more software applications in order to provide the functions described in this specification, specifically to execute and perform the steps and functions in the methods described above. Such methods and the processing may be implemented in software, such as software modules, for execution by computers or other machines. The GUIs may be formatted, for example, as web pages in HyperText Markup Language (HTML), Extensible Markup Language (XML) or in any other suitable form for presentation on a display device depending upon applications used by users to interact with the system (or application).

Input device may include any device for entering information into processing node 800, such as a touch-screen, keyboard, mouse, cursor-control device, touch-screen, microphone, digital camera, video recorder or camcorder. The input device may be used to enter information into GUIs during performance of the methods described above. The display device may include any type of device for presenting visual information such as, for example, a computer monitor or flat-screen display (or mobile device screen). The display device may display the GUIs and/or output from sub-system components (or application). Output device may include any type of device for presenting a hard copy of information, such as a printer, and other types of output devices include speakers or any device for providing information in audio form.

Examples of processing node 800 include dedicated server computers, such as bladed servers, personal computers, laptop computers, notebook computers, palm top computers, network computers, mobile devices, or any processor-controlled device capable of executing a web browser or other type of application for interacting with the system.

Although only one processing node 800 is shown in detail, the system may use multiple computer system or servers as necessary or desired to support the users and may also use backup or redundant servers to prevent network downtime in the event of a failure of a particular server. In addition, although processing node 800 is depicted with various components, one skilled in the art will appreciate that the server can contain additional or different components. In addition, although aspects of an implementation consistent with the above are described as being stored in memory, one skilled in the art will appreciate that these aspects can also be stored on or read from other types of computer program products or non-transitory computer-readable media, such as secondary storage devices, including hard disks, floppy disks, or CD-ROM; or other forms of RAM or ROM. The computer-readable media may include instructions for controlling a computer system, processing node 800, to perform a particular method, such as methods described above.

Figure 9B:
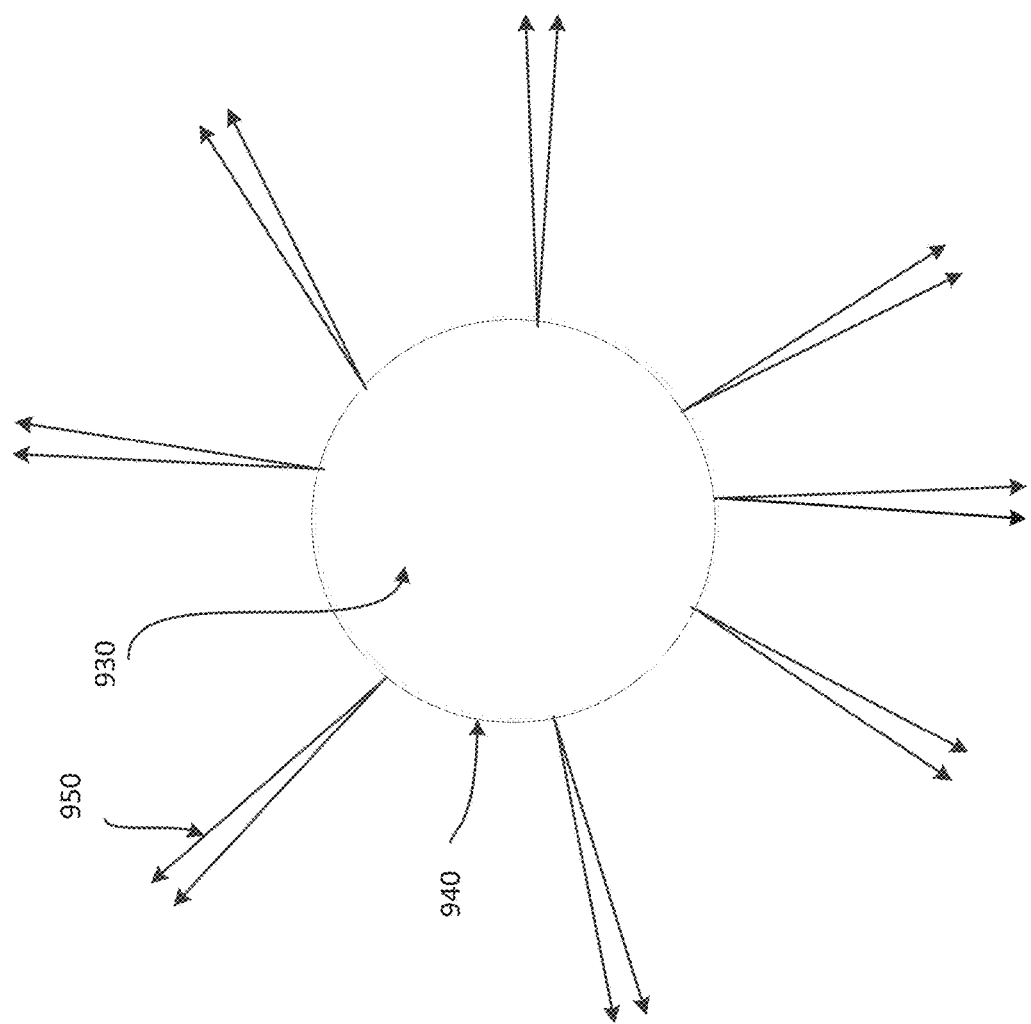
FIG. 9B illustrates the cellular base station tower with a DDA according to an example embodiment of the present invention.
Figure 9A:
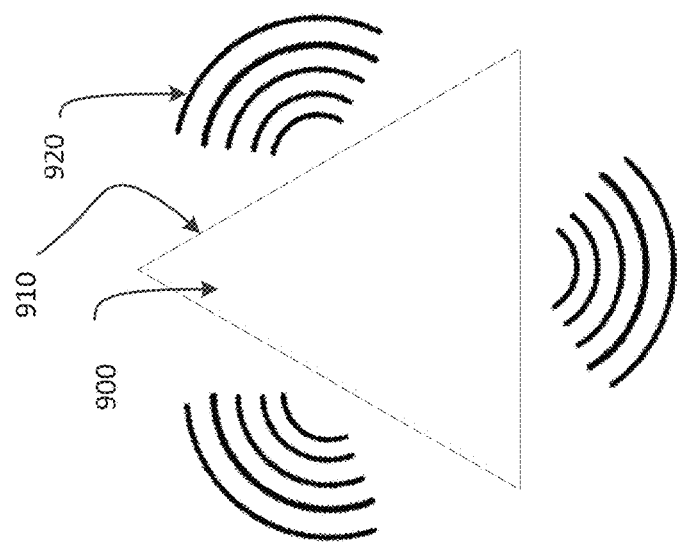
FIG. 9A illustrates a cellular base station tower according to the prior art.

FIGS. 9A and 9B illustrate a comparison of the emissions from a standard cellular base station and emissions from a cellular base station tower equipped with a DDA. FIG. 9A illustrates a cellular base station tower according to the prior art. The cellular base station tower 900 includes three antennas 910. Each of the antennas 910, serves, e.g. transmits to and receives from 120 degrees of the horizon. Resultantly, the transmission and receiving beam 920 is 120 degrees. Adjacent cellular towers 900 typically do not use the same cellular spectrum channels to avoid interference, as such each cellular tower may have a limited number of cellular channels to send and receive cellular signals. The channel usage is further limited by the size of the antenna beam, e.g. 120 degrees, effectively limiting the use of the channel to three users per tower, e.g. one for each antenna. The number of cellular users per channel may be expanded by encoding the cellular signal based on a subscriber identity, such as an international mobile subscriber identity. The cellular base station may encode the subscriber data, to allow multiple users, e.g. subscribers to utilize the same cellular spectrum channel of the same antenna. Some examples of the subscription codes may include without limitation frequency domain multiple access (FDMA), code division multiple access (CDMA), polarization division multiple access (PDMA), time division multiple access (TDMA), or the like.

FIG. 9B illustrates the cellular base station tower according to an example embodiment of the present invention. In contrast to the three antenna configuration, discussed in FIG. 9A, the DDA 940 of the cellular base station 930 may have thousands of apertures, e.g. sensors and emitters. One or more sensors, such as sensors 512 of FIG. 5, may receive a cellular signal, from which a receive beam may be calculated by the beamformer, as discussed in FIG. 5. The telemetry subsystem 520 may convey the received cellular signal to the beamformer 570. In some example embodiments the received cellular signal may include a subscriber identifier, such as an international mobile subscriber identity. The received cellular signal may be passed to a cellular network (shown in FIG. 12). Cellular data may be received from the cellular network, such as in response to the received cellular signal. The beamformer 570 determine emitting data for one or more emitters, such as emitter 411 as discussed in FIG. 4. The emitting data may be configured to generate a transmit beam 950 focused toward the cellular device from which the cellular signal was received. In some example embodiments, the transmit beam 950 may have a beam width of less than or about 5 degrees, less than or about 3 degrees, less than or about 1 degree, or any other beam width. In some cases it may be advantageous for the beam to be quite wide, e.g., the beam might be initially set to 120 degrees in order to establish initial connection with a user device, and the beam might be narrowed as the connection is negotiated. The transmit beam 950 may carry the cellular data received from the cellular network.

In an example embodiment, the beamformer 570 may sample the waveform of the received cellular signal from the one or more sensors 512, as discussed in FIGS. 4 and 5. The curve of the wavefront, determined by the beamformer 570 may be indicative of the location of the cellular device. The beamformer 570 may determine a location, e.g. vector data including one or more of an azimuth, elevation, and distance relative to a point within the array of sensors and/or emitters.

The location of the cellular device relative to the respective emitters 410 may be used to determine the emitting data as discussed in FIG. 5.

The relatively narrow transmit beam, by comparison to conventional cellular base station towers, may allow the cellular base station tower 930 equipped with a DDA to transmit dozens of beams 950 in multiple directions, e.g. azimuths. Using beams of less than or about 5 degrees beam width as an example, the DDA may be able to transmit up to 72 separate transmit beams without overlap, or 120 beams using a less than or about 3 degree beam width, resulting in over fifty times increase in spectrum reuse. It is further noted that the example embodiment is in only the x, y axis, e.g. azimuth, and that further spectrum reuse may be achieved in the z axis, e.g. elevation. In some example embodiments, the beamformer 470 may be configured to process $10^{13}$ to $10^{17}$ instructions per second to generate the transmit beams enabling reuse of cellular spectrum and other signal characteristics among different beams formed by the beamformer, thereby increasing system data rate efficiency. The relatively large processing loads may be due to the number and dynamic nature of the transmit beams.

An additional benefit of the directional receive and transmit beams is neighboring cellular base stations may use more or, in some cases, the entire cellular communication spectrum, by coordinating with adjacent cellular base stations, for example through the cellular network to limit interference, e.g. crossing beams. In some examples, a first cellular base station may limit use of specified channels in only the direction of a second cellular base station tower. In other example embodiments, the coordination may be specific to the individual beam directions, e.g. azimuth and elevation, preventing receive and transmit beams which would cross at a point in there range of propagation. In an example embodiment, a spectrum coordinator may be provided to coordinate the cellular communication spectrum usage across one or more DDAs, as discussed in FIG. 12.

In an example embodiment, the number of cellular users per channel may be expanded, similar to conventional cellular base station towers, by encoding the cellular signal based on a subscriber identity, such as an international mobile subscriber identity. The cellular base station may encode the subscriber data, to allow multiple users, e.g. subscribers to utilize the same cellular spectrum channel of the same antenna. Some examples of the subscription codes may include without limitation frequency domain multiple access (FDMA), code division multiple access (CDMA), polarization division multiple access (PDMA), time division multiple access (TDMA), or the like.

Figure 10A:
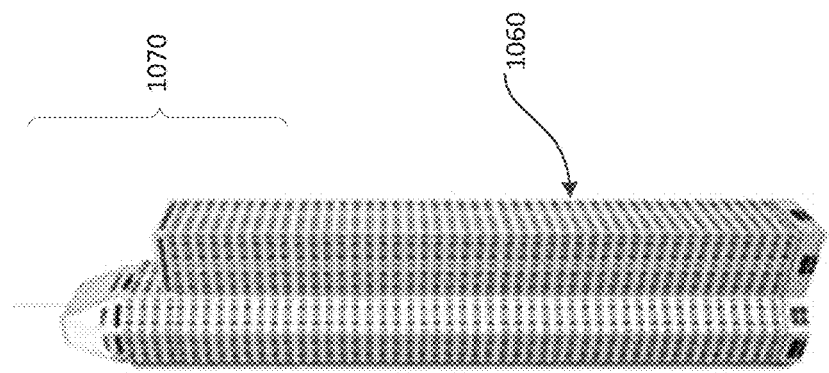
FIG. 10A illustrates example distributions of a DDA on entity surfaces in according to embodiments of the present invention.
Figure 10A:
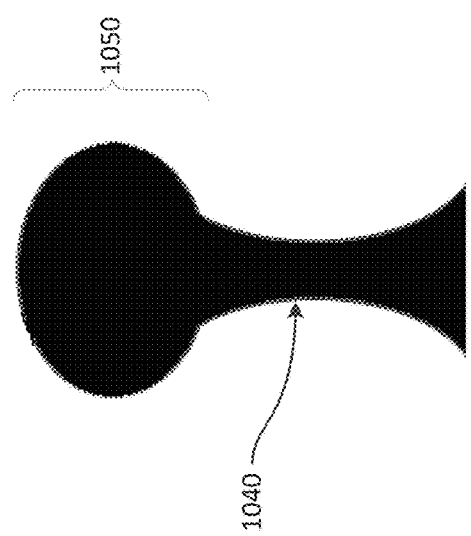
Figure 10A:
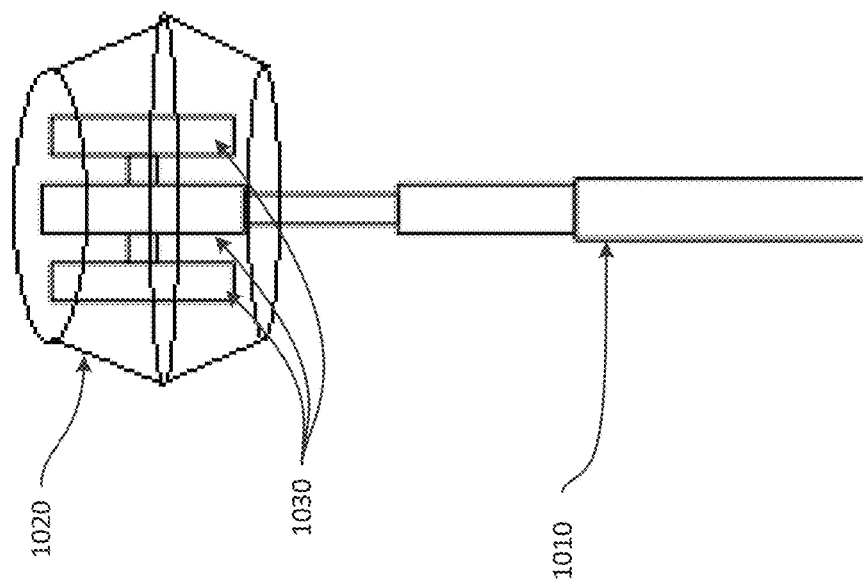

FIG. 10A illustrates example distributions of a DDA on entity surfaces in according to embodiments of the present invention. A benefit of the DDA is that it may be distributed to the surface of existing structures with little or no modification. In an example embodiment, a conventional cellular base station tower 1010 may be modified by placing a DDA array 1020 to replace the three antennas 120. The DDA array may be include a ridged structure, such as, a metal, plastic, or similar frame. The apertures, e.g. sensors and emitters, of the DDA 1020 may be embedded in a skin, fabric or other light weight material, which may affixed to the ridged structure. In some embodiments, the ridged structure and aperture skin, e.g. the entity surface, may resemble a lamp shade like design. In an example embodiment, the DDA may have breeze holes to limit the stress of wind and weather on the aperture skin.

In other embodiments, the DDA 1050 may be distributed over a surface of an existing structure, such as a water tower 1040. The DDA apertures 1050 may be painted on to the elevated portion of the structure 1040. As discussed above the DDA apertures may be applied in a skin, painted, silk screens, or the like. A benefit of utilizing entities, such as water towers, may be the large numbers of such entities in place in both rural and suburban areas.

In some example embodiments, the DDA 1070 may be distributed over the external surface of other entities, such as a high-rise 1060 or skyscraper. The elevation may be beneficial to transmission and reception of the cellular signals. Similarly, the DDA may be applied to natural formations, such as bluffs, cliffs, or the like.

In any of the above described embodiments, the distribution of the DDA apertures may be sufficient to provide information for directional processing in all azimuths and elevations relative to the cellular base station tower. In an example embodiment, in which the array portion of the DDA is sufficient size, for example 50 to 100 feet across, the beamformer may be able to determine a distance of a cellular device, for example up to 3 to 4 miles away from the DDA.

In an example embodiment, the beamformer may receive the cellular signal from a plurality of sensor apertures, and define a series of "bins." The beamformer may then determine a beam source signal, e.g. a receive beam, based on a calculation of a probable signature of a subsequent source signal across individual sensor apertures. Bins may be defined by azimuth, azimuth and elevation, or azimuth, elevation, and distance, as discussed above. The beamformer may process received signals corresponding to various bin shapes, beyond directional. In some example embodiments, the beamformer may use coherent processing of the information received from each sensor aperture. Although, bins are discussed as defined by an azimuth, elevation, and/or distance, one of ordinary skill in the art would immediately appreciate that any convenient dimensional frame of reference may be utilized, such as Cartesian (x, y, z) or polar (bearing, elevation, distance).

Figure 10B:
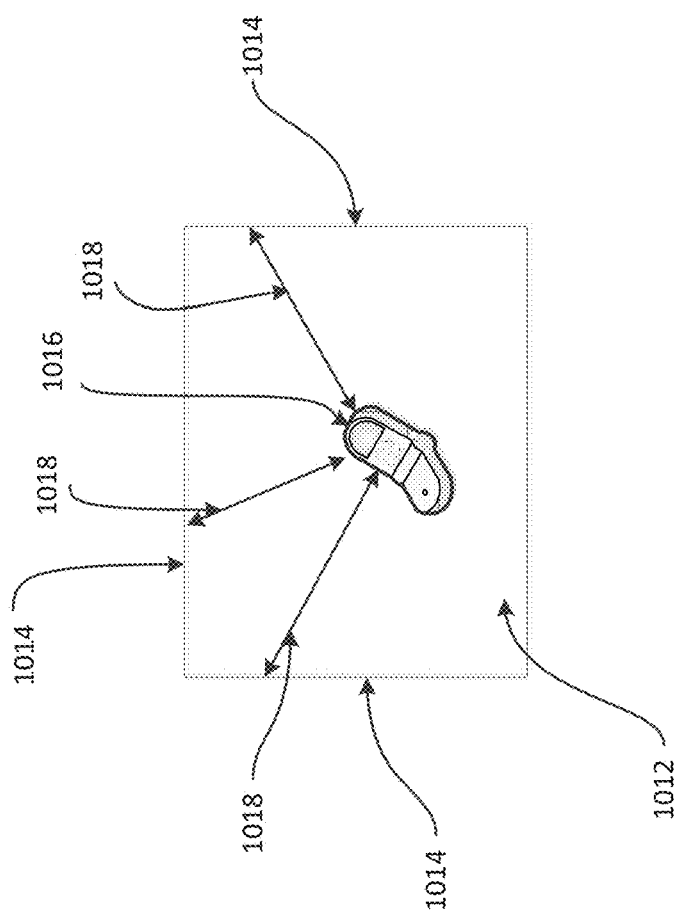
FIG. 10B illustrates examples of the DDA distributed over a plurality of surfaces and/or entities in accordance with embodiments of the present invention.
Figure 10B:
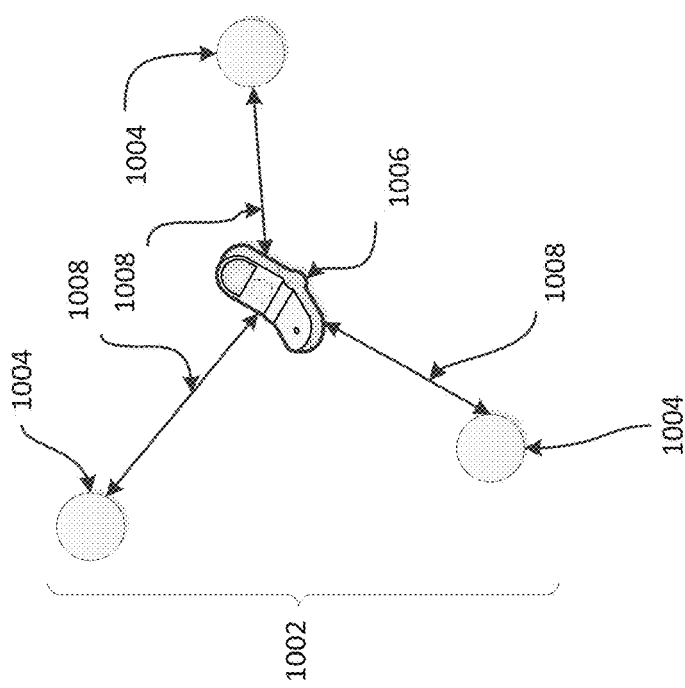

FIG. 10B illustrates example embodiments of the DDA distributed over a plurality of surfaces and/or entities. In an example embodiment of the DDA, the apertures, e.g. sensors and emitters may be distributed over a plurality of surfaces and/or entities. One such example may include a plurality of cellular base equipped with a single DDA 1002. Each or the cellular base station towers 1004 may include a portion of the array, e.g. apertures, of the DDA operably coupled to a beamformer 570 by the telemetry subsystem. In this example embodiment, the user or cellular device may be "within" the array. "Within" the array or substantially within the array may include total emersion within the radio frequency coverage area of the array to radio frequency proximity, e.g. coverage, of at least one DDA, sufficient to determine an azimuth, elevation and distance of the cellular device relative to the respective sensors. The beamformer may receive waveform sample information from sensors from one or more of the sensors from the one or more surfaces based on a received cellular signal. The distribution of sensors across multiple surfaces with diverse locations may allow the beamformer to determine a highly accurate cellular device 1006 location, including azimuth, elevation and distance, e.g. vector and distance data. The beamformer 570 may use the cellular device 1006 location to calculate emitting data for transmit beam 1008, as discussed above in FIG. 5.

In an example embodiment, the entity may be the interior of an occupiable structure, such as a sports arena or stadium, a shopping mall, office building, convention center or the like. The entity may have a DDA 1012 distributed across a plurality of surfaces 1014, such as ceiling, walls, pillars, windows, or the like. Similar to the DDA 1002 using multiple cellular towers, the DDA 1012 distributed on the interior of an entity may receive cellular signals information from sensors from one or more of the sensors from the one or more surfaces 1014. The distribution of sensors across multiple surfaces with diverse locations may allow the beamformer to determine a highly accurate cellular device 1006 location internal to the structure. The beamformer 570 may use the cellular device 1006 location to calculate emitting data for transmit beam 1018, as discussed above in FIG. 5.

In any of the above described embodiments of FIG. 10B, the distribution of the DDA apertures across the plurality of surfaces and/or entities may be sufficient to provide information for directional processing in all azimuths, elevations, and distances relative to sensors of the DDA.

Figure 12:
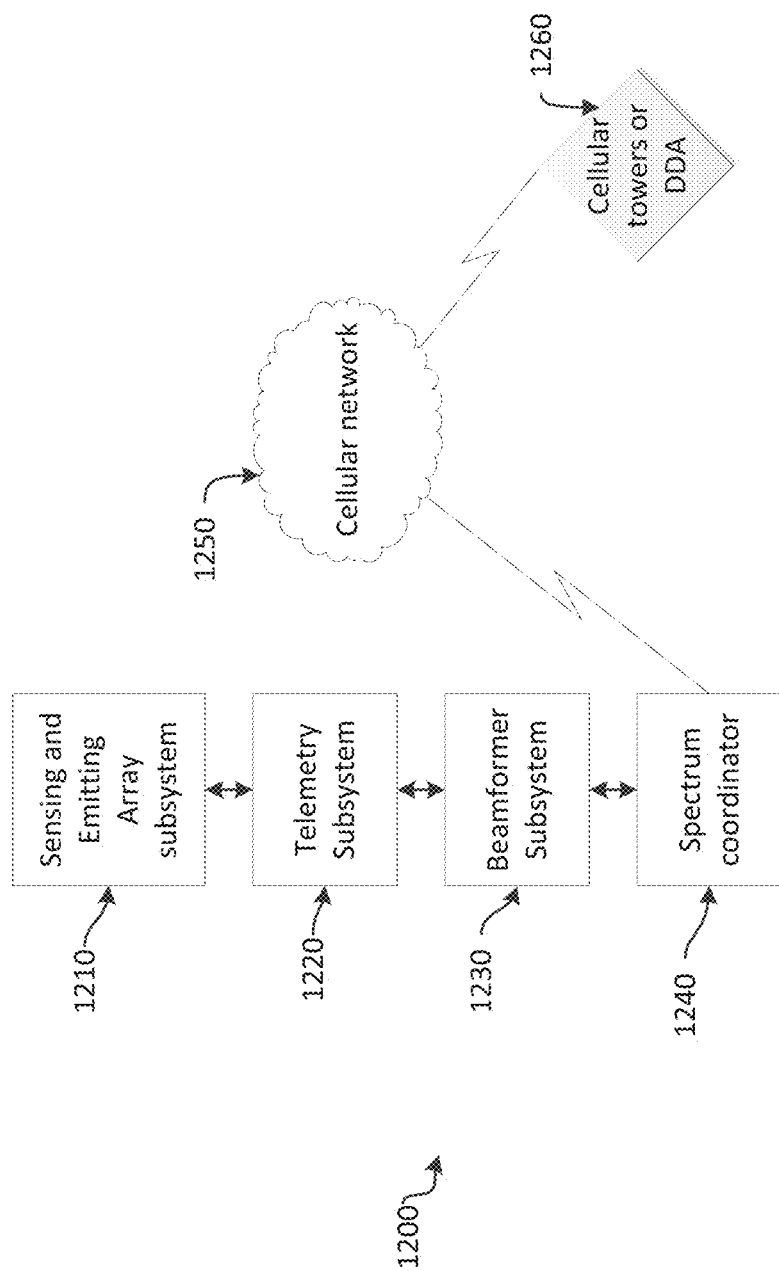
FIG. 12 illustrates a DDA including a spectrum coordinator according to an example embodiment of the present invention.

In an example embodiment of the DDA in which the array portion is distributed across a plurality of surfaces of one or more entities, a spectrum coordinator may be provided to coordinate cellular communication spectrum usage in beams of locations, to minimize interference, as discussed in FIG. 12.

Figures 11A, 11B:
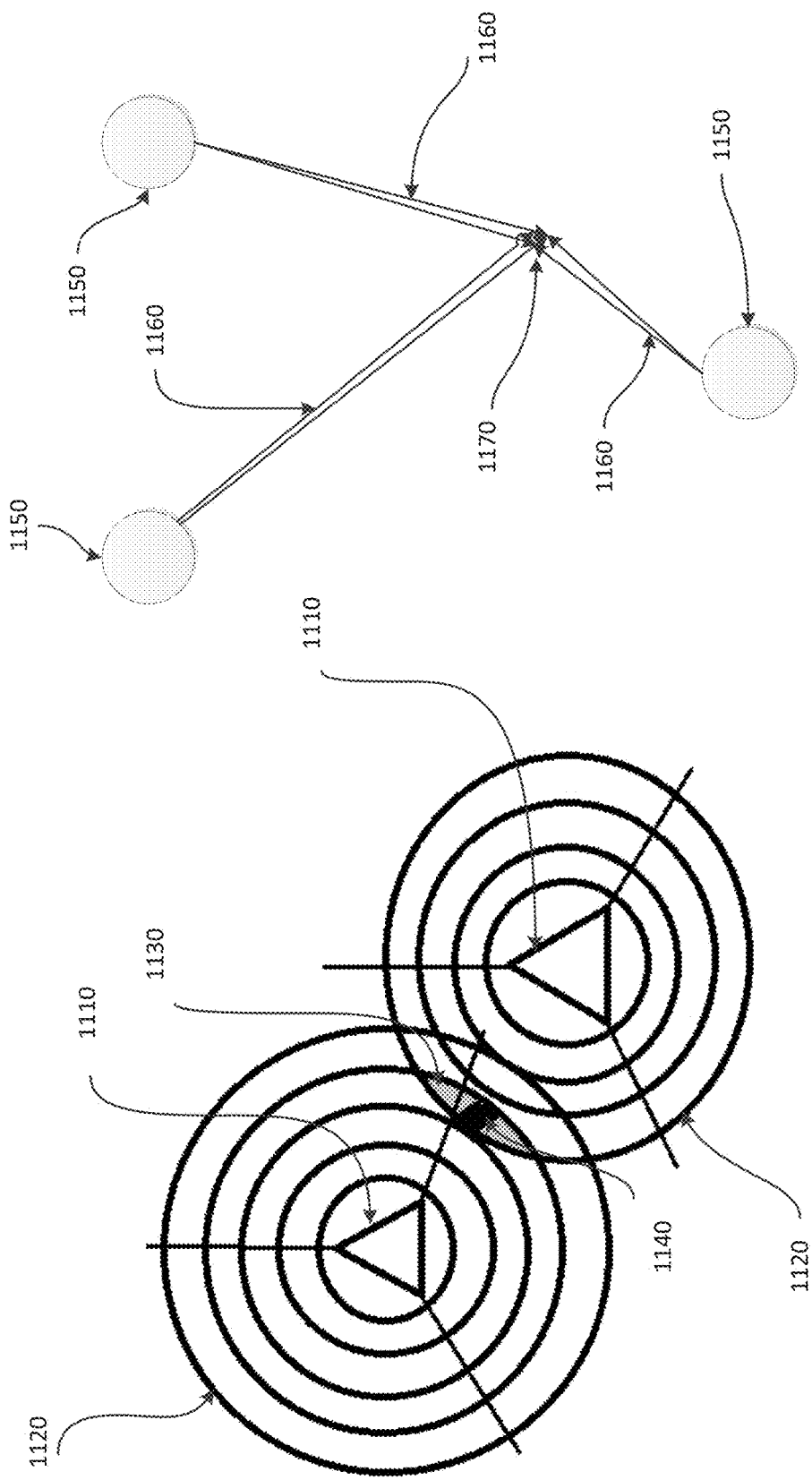
FIG. 11A illustrates a cellular crossfix location determination according to the prior art.
FIG. 11B illustrates a cellular crossfix location determination according to an embodiment of the present invention.

FIG. 11A illustrates a cellular crossfix location determination according to the prior art. The location of a cellular device 1140 may be determined by two or more cellular base stations. Each of the base stations 1110 may receive a signal from the cellular device 1140 at one of the three antennas, as discussed above at FIG. 9A. Each of the cellular base stations 1110 may determine a range estimate of the cellular device 1140 from the cellular base station. The ranges are depicted by the concentric circles 1120. A crossfix location of the cellular device 1140 may be determined as the overlapping areas of the 120 degree estimated ranges of each cellular tower. In areas with a relatively high density of cellular base stations, the crossfix location accuracy may be relatively accurate. However, in areas with low cellular base station density, for example only two or three towers, the crossfix location accuracy may be very inaccurate, for example over a mile in variance.

FIG. 11B illustrates a cellular crossfix location determination according to an embodiment of the present invention. Similar to the determination of the conventional cellular tower, each DDA base station 1150 receives a signal from the cellular device 1170. However, the DDA may calculate reception beam widths 1160 of less than or about 5 degrees, less than or about 3 degrees, less than or about 1 degree, or the like. As such, the narrow range estimates, e.g. vector data, may be result in overlapping areas which, relative to conventional cellular base stations, are extremely small, even in areas with sparse cellular base station density, resulting in an accurate crossfix location. The vector data may include an azimuth and in some instances an elevation, in addition to the range estimate.

The computation of the crossfix location may be determined by a location device. In an example embodiment, a device in communication with the cellular network may receive the vector data and or range estimates from the cellular base station towers 1110 and or the cellular base station towers with DDA 1150. The location device may determinate the crossfix location based on the received vector data and range estimates. In some example embodiments, location device may be the beamformer or other portion of the DDA, which may receive range estimates or vector data from one or more cellular base stations 1110 or 1150 in addition the vector data associated with the beamformer. In this instance, the beamformer or other portion of the DDA may be the location device determining the crossfix location.

In an example embodiment, in which two or more DDAs determine a crossfix location, the coherent aspects of the received signals may be coherently calculated by the respective beamformer of each DDA. The location device may use the azimuth and distance information from each DDA to calculate the crossfix incoherently.

The crossfix location depicted illustrates using three DDA equipped cellular towers 1150, however on of ordinary skill in the art would immediately appreciate that one or more DDA equipped cellular towers 1150 may generate a crossfix location with one or more conventional cellular towers 1110, resulting in a significantly more accurate crossfix location than conventional cellular towers alone. Additionally, although discussed in terms of cellular base station towers equipped with a DDA, one of ordinary skill in the art would immediately appreciate that the cellular communication and crossfix location determinations may be any entity equipped with a DDA.

The cellular tower providing cellular communication service may use the crossfix data or DDA location determination, as dicussed in FIGS. 10A and 10B, e.g. location information for geographical specific services, such as map and direction, social media application, cellular tower handover coordination, or the like. Location data, associated with the crossfix location or DDA location determination may be sent or received in association with the receive and transmit beams, discussed above. Additionally, due to the accuracy of the crossfix location or DDA location determination processes direction of travel, as determined based on previous and current position, may be determined. The crossfix location or DDA location determination processes may also be used to anticipate the location of the cellular device, for turn by turn directions, social media contact meet up/or avoidance, and identifying when and which cellular tower should be in the handover, or other location based services and/or processes.

FIG. 12 illustrates an example embodiment of a DDA which includes a spectrum coordinator. The DDA 1200 may include a sensing and emitting array subsystem 1210, a telemetry subsystem 1220, and a beamformer subsystem which may be substantially similar to the sensing and emitting array subsystem 210, telemetry subsystem 220, and the beamformer subsystem 230 as discussed in FIG. 2. The DDA 1200 may also include a spectrum coordinator 1240. The spectrum coordinator may be a portion of the beamformer subsystem 1230 or an input to the beam former subsystem.

The spectrum coordinator 1240 may be configured to receive the calculated azimuth and elevation of one or more receive signals, from the beamformer 1230, in an embodiment in which the DDA is distributed over a single surface or single entity. The spectrum coordinator 1240 may receive spectrum usage of cellular towers within the radio frequency coverage range of the DDA 1200 and/or the azimuth and elevation of one or more transmit beams of a DDA within the radio frequency coverage range of the DDA 1260 through wired or wireless communication such as through the cellular network 1250. The spectrum coordinator 1240 may provide azimuths and elevations and associated cellular communication spectrum channel to the beamformer 1230. Azimuths and elevations and the associated cellular communication spectrum channels, e.g. channel data, may be the channels with would not cause interference in the provided azimuth and elevations. The beamformer 1230 may use the provided channel data to form transmit beams associated with the received beam which may limit or prevent radio frequency interference by utilizing channels which are not identified in the azimuth and elevation of the received signal.

In an example embodiment in which the DDA array is configured to determine an azimuth, elevation, and distance relative to the sensors of the sensing and emitter array subsystem 1210, e.g. the cellular device may be within the array. The spectrum coordinator 1240 may receive the azimuth, elevation and distance from the beamformer 1230. In some example embodiments the spectrum coordinator 1240 may also receive cellular communication spectrum channel usage information from conventional cellular towers, DDAs, or the like 1260 within radio frequency coverage of the DDA 1200.

The spectrum coordinator may provide channel data including location, e.g. azimuth, elevation and distance from the respective sensors or reference point and associated cellular communication spectrum channels, which may be used to not cause interference in the provided receive beam location. Although the receive and transmit beam of a DDA which is distributed across an sensor and emitter array sufficient to provide a location, e.g. azimuth, elevation, and distance, relative to the specified sensors, it would be immediately understood by one of ordinary skill in the art, that the beamformer 1230 may use beams as discussed above or tune the waveform of the emitters to focus the energy at a specified location within the coverage area of the area.

Continuing with the example embodiment, the beamformer 1230 may generate emitting data for one or more emitters based on the channel data to transmit a beam or focus location, limiting or preventing cellular communication interference.

Although, channel data has been described as channels which are available for use, one of ordinary skill in the art would immediately appreciate that the channel data may also be the channels and locations or beam azimuths and elevations which would cause interference.

In some embodiments, the features described above may be augmented or modified, or additional features may be added. These augmentations, modifications and additions may be optional and may be provided in any combination. Thus, although some example modifications, augmentations and additions are listed below, it should be appreciated that any of the modifications, augmentations and additions could be implemented individually or in combination with one or more, or even all of the other modifications, augmentations and additions that are listed. As such, in an example embodiment of the cellular communication transceiver, the surface is disposed at structure comprising a water tower, building, natural formation or cellular tower. In an example embodiment of the cellular communication transceiver, the surface is disposed to extend 360 degrees around an elevated structure. In some example embodiments of the cellular communication transceiver, the aperture elements are embedded into a composite skin provided at the surface. In some example embodiments of the cellular communication transceiver, the aperture elements are silk-screened onto the surface. In an example embodiment of the cellular communication transceiver, a beam width of the directional receive and transmit beams is less than about three degrees. In some example embodiments of the cellular communication transceiver, a beam width of the directional receive and transmit beams is between about three degrees and about five degrees. In an example embodiment of the cellular communication transceiver telemetry data associated with the directional receive and transmit beams is provided to a location device, the location device being configured to determine location information indicative of a location of a device communicating with the cellular communication transceiver. In an example embodiment of the cellular communication transceiver, the telemetry data is employed by the location device along with telemetry data from at least one other cellular communication transceiver to define a crossfix location of the device. In some example embodiments of the cellular communication transceiver, the location information is employed for the provision of geographically specific services. In an example embodiment, the cellular communication transceiver, the beam former is configured to utilize subscription codes to differentiate subscriber data, in an instance in which two or more subscriber signals are transmitted on the same cellular communication spectrum channel. In an example embodiment of the cellular communication transceiver, the installation of the plurality of aperture elements on the surface is sufficient to provide information for directional processing in all azimuths and elevations. In an example embodiment of the cellular communication transceiver the directional receive or transmit beams are formed based on azimuth, elevation, or distance.

In an example embodiment of the cellular communication transceiver, the beamformer is configured to process instructions at speeds of at least $10^{13}$ instructions per second. In some example embodiments of the cellular communication transceiver, the beamformer is configured to enable spectrum reuse among different beams formed by the beamformer. In an example embodiment of the cellular communication transceiver, the surface comprises a plurality of surfaces of a plurality of entities. In some example embodiments of the cellular communication transceiver, the surface comprises one or more interior surfaces of an occupiable structure. In an example embodiment of the cellular communication transceiver, a cellular device may be internal to the array.

Many modifications and other embodiments of the inventions set forth herein will come to mind to one skilled in the art to which these inventions pertain having the benefit of the teachings presented in the foregoing descriptions and the associated drawings. Therefore, it is to be understood that the inventions are not to be limited to the specific embodiments disclosed and that modifications and other embodiments are intended to be included within the scope of the appended claims. Moreover, although the foregoing descriptions and the associated drawings describe exemplary embodiments in the context of certain exemplary combinations of elements and/or functions, it should be appreciated that different combinations of elements and/or functions may be provided by alternative embodiments without departing from the scope of the appended claims. In this regard, for example, different combinations of elements and/or functions than those explicitly described above are also contemplated as may be set forth in some of the appended claims. In cases where advantages, benefits or solutions to problems are described herein, it should be appreciated that such advantages, benefits and/or solutions may be applicable to some example embodiments, but not necessarily all example embodiments. Thus, any advantages, benefits or solutions described herein should not be thought of as being critical, required or essential to all embodiments or to that which is claimed herein. Although specific terms are employed herein, they are used in a generic and descriptive sense only and not for purposes of limitation.

What is claimed is:

1. A cellular communication transceiver comprising:
   an array comprising a plurality of aperture elements distributed over a surface, the aperture elements being configured to receive and transmit cellular communication signals;
   a beamformer configured to apply a time domain beamforming process to the cellular communication signals to enable directional receive and transmit beams to be formed using the aperture elements, wherein forming the receive and transmit beams is based on temporal alignment values associated with the plurality of aperture elements, the temporal alignment values being determined via computation of relative locations of each of the aperture elements within the plurality of aperture elements, wherein the temporal alignment is also based on a position and attitude of the surface over which the plurality of aperture elements are distributed; and
   a telemetry subsystem operably coupling the aperture elements to the beamformer.

2. The cellular communication transceiver of claim 1, wherein the directional receive or transmit beams are formed based on azimuth, elevation, or distance.

3. The cellular communication transceiver of claim 1, wherein the surface is disposed at a structure comprising a water tower, building, natural formation or cellular tower.

4. The cellular communication transceiver of claim 1, wherein the surface is disposed to extend 360 degrees around an elevated structure.

5. The cellular communication transceiver of claim 1, wherein the aperture elements are embedded into a composite skin provided at the surface.

6. The cellular communication transceiver of claim 1, wherein the aperture elements are silk-screened onto the surface.

7. The cellular communication transceiver of claim 1, wherein a beamwidth of the directional receive and transmit beams is less than about three degrees.

8. The cellular communication transceiver of claim 1, wherein a beamwidth of the directional receive and transmit beams is between about three degrees and about five degrees.

9. The cellular communication transceiver of claim 1, wherein vector data associated with the directional receive and transmit beams is provided to a location device, the location device being configured to determine location information indicative of a location of a device communicating with the cellular communication transceiver.

10. The cellular communication transceiver of claim 9, wherein the vector data is employed by the location device along with vector data from at least one other cellular communication transceiver to define a crossfix location of the device.

11. The cellular communication transceiver of claim 9, wherein the location information is employed for the provision of geographically specific services.

12. The cellular communication transceiver of claim 1, wherein the beamformer is configured to utilize subscription codes to differentiate subscriber data, in an instance in which two or more subscriber signals are transmitted on a cellular communication spectrum channel.

13. The cellular communication transceiver of claim 1, wherein the plurality of aperture elements on the surface operate to provide information for directional processing by the beamformer in a plurality of azimuths and elevations.

14. The cellular communication transceiver of claim 1, wherein the beamformer is configured to process instructions at speeds of at least $10^{13}$ instructions per second.

15. The cellular communication transceiver of claim 1, wherein the beamformer is further configured to generate a plurality of transmit beams in a plurality of transmit directions that are less than about 5 degrees apart and employ reuse of spectrum and other signal characteristics among the plurality of transmit beams formed by the beamformer.

16. The cellular communication transceiver of claim 1, wherein the surface comprises a plurality of surfaces of a plurality of entities.

17. The cellular communication transceiver of claim 1, wherein the surface comprises one or more interior surfaces of an occupiable structure.

18. The cellular communication transceiver of claim 1, wherein the beamformer is further configured to form the directional receive and transmit beams in coordination with a neighboring base station to limit beam crossing with a beam formed by the neighboring base station.

19. A cellular communication transceiver comprising:
   an array comprising a plurality of aperture elements distributed over a plurality of surfaces of one or more entities, the aperture elements being configured to receive and transmit cellular communication signals from a cellular device substantially within the array;
   a beamformer configured to apply a time domain beamforming process to the cellular communication signals to enable directional receive and transmit beams to be formed using the aperture elements, wherein forming the directional receive and transmit beams is based on temporal alignment values associated with the plurality of aperture elements, the temporal alignment values being determined via computation of relative locations of each of the aperture elements within the plurality of aperture elements, wherein the temporal alignment is also based on the a position and attitude of the surface over which the plurality of aperture elements are distributed; and
   a telemetry subsystem operably coupling the aperture elements to the beamformer at the surface.

20. A cellular communication transceiver comprising:
   an array comprising a plurality of aperture elements distributed over a surface, the aperture elements being configured to receive and transmit cellular communication signals;
   a beamformer configured to apply a time domain beamforming process to the cellular communication signals to enable directional receive and transmit beams to be formed using the aperture elements, wherein forming the receive and transmit beams is based on temporal alignment values associated with the plurality of aperture elements, the temporal alignment values being determined via computation of relative locations of each of the aperture elements within the plurality of aperture elements, wherein the temporal alignment is also based on the a position and attitude of the surface over which the plurality of aperture elements are distributed;
   a telemetry subsystem operably coupling the aperture elements to the beamformer; and
   a spectrum coordinator configured to receive cellular communication spectrum channel usage data and provide beamformer channel data to limit cellular communication interference, wherein directional transmit beams are formed based on the channel data.

* * * * *